(12) United States Patent
Kim et al.

(10) Patent No.: US 6,346,682 B2
(45) Date of Patent: Feb. 12, 2002

(54) RAMBUS HANDLER

(75) Inventors: Nam-hyoung Kim; Jae-gyun Shim; Beum-hee Lee, all of Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/727,496

(22) Filed: Dec. 4, 2000

(30) Foreign Application Priority Data

| Dec. 6, 1999 | (KR) | 99-55206 |
| Dec. 14, 1999 | (KR) | 99-57612 |
| Feb. 7, 2000 | (KR) | 00-5642 |
| Apr. 14, 2000 | (KR) | 00-19553 |
| Apr. 14, 2000 | (KR) | 00-19554 |
| Apr. 14, 2000 | (KR) | 00-19555 |
| Nov. 10, 2000 | (KR) | 00-66867 |

(51) Int. Cl.[7] ............................................. B07C 5/344
(52) U.S. Cl. ........................ 209/573; 73/865.6; 414/153
(58) Field of Search .............................. 209/552, 559, 209/560, 571, 573, 643; 73/865.6; 414/150, 153, 331.14, 935, 936, 941

(56) References Cited

U.S. PATENT DOCUMENTS

| 5,307,011 A | * | 4/1994 | Tani | 324/158 F |
| 5,313,156 A | * | 5/1994 | Klug et al. | 324/158 |
| 5,788,084 A | * | 8/1998 | Onishi et al. | 209/573 |
| 5,865,319 A | * | 2/1999 | Okuda et al. | 209/574 |
| 5,957,305 A | * | 9/1999 | Takahashi | 209/573 |
| 6,248,967 B1 | * | 6/2001 | Nakamura | 209/573 |

\* cited by examiner

*Primary Examiner*—Christopher P. Ellis
*Assistant Examiner*—Mark J. Beauchaine
(74) *Attorney, Agent, or Firm*—Robert E. Bushnell, Esq.

(57) ABSTRACT

A test handler for automatically testing rambus type semiconductor devices. The rambus type test handler includes a user tray stacker for stacking a plurality of user trays which are loaded with semiconductor device that have been, or will be tested; a device loading portion for picking up the semiconductor devices from the user trays at a supplying position and loading the semiconductor devices onto boats at a loading position; a heating/cooling chamber for heating or cooling the boats according to test requirements by order of boat receipt from device loading portion; a test chamber for connecting the heated or cooled semiconductor devices to test sockets for testing; a recovering chamber for recovering the temperature of the semiconductor devices to a normal degree, while elevating the boats and discharging the boats through an upper end, sequentially, by order of boat receipt from a lower end of the test chamber; a device sorting portion for picking up test-completed semiconductor devices from the boats discharged from the recovering chamber and stacking respective grades of semiconductor devices to correspondingly predetermined areas of a plurality of conveying buffers; and a device unloading portion for stacking the semiconductor devices from the conveying buffers to the user trays corresponding to the respective grades of the semiconductor devices. Further, there are provided a device loading portion, displaceable hand for sorting the semiconductor devices, contact picker assembly of the test chamber, and position guiding portion.

37 Claims, 20 Drawing Sheets

RAMBUS HANDLER

CLAIM OF PRIORITY

This application makes reference to, incorporates the same herein, and claims all benefits accruing under 35 U.S.C. §119 from seven (7) applications entitled "HAND OF VARIABLE PITCH", "APPARATUS AND METHOD FOR TESTING SEMI-CONDUCTOR DEVICE OF RAMBUS HANDLER", "RAMBUS HANDLER", APPARATUS FOR TESTING SEMI-CONDUCTOR DEVICE OF TEST HANDLER AND METHOD THEREFOR, APPARATUS FOR TESTING SEMI-CONDUCTOR DEVICE OF TEST HANDLER", "CONTACT PICKER ASSEMBLY FOR TESTHANDLER", and "RAMBUS HANDLER", filed with the Korean Industrial Property Office respectively on Dec. 6, 1999, Dec. 14, 1999, Feb. 7, 2000, Apr. 14, 2000, Apr. 14, 2000, Apr. 14, 2000, and Nov. 10, 2000,and there duly assigned Ser. Nos. 55206/1999, 57612/1999, 5642/2000, 19553/2000, 19554/2000, 19555/2000, and 66867/2000, respectively.

BACKGROUND OF THE INVENTION

1. Field of the Invention

The present invention relates to a test handler for testing performance of electronic components such as Integrated Circuits (IC), semiconductor chips, etc., and more particularly to a test handler, a rambus handler, capable of automatically testing Ball Grid Array (BGA) or Chip Size Package (CSP) type semiconductor devices.

2. Description of the Related Art

Generally, complete assemblies of semiconductor devices (hereinafter called devices) are tested for performances. A test handler tests the devices, in a manner that a certain number of devices are conveyed and connected to test heads for testing, and graded, grouped, and stacked according to the test results. Various test handlers are developed for testing the devices of various shapes and types.

Such test handlers are constructed to test the devices generally having electrodes (so-called leads or pins) protruding from an outer surface of a package.

Recently, new types of devices of high-integration such as Ball Grid Array (BGA) or Chip Size Package (CSP) type devices have been mass-produced. The BGA or CSP type devices have an area array arrangement in which a plurality of electrodes are arranged on a lower surface of the package. Due to different electrode arrangement of BGA or CSP type devices, in which the electrodes are arranged on the lower surface of the devices, there is few conventional test handlers which could perform the testing operation upon these devices. Accordingly, there is a growing demand for the proper testing device to test the BGA or CSP type devices.

When testing the devices, also, since the devices have to be in direct contact with sockets of the test heads, it is required that devices be employed in the test device to guide and press the devices at a proper pressure.

In a general test handler, there are different pitches both between user trays for supplying the devices and between device receiving sections of device testing boats. Accordingly, for a higher testing efficiency, while picking-and-placing the devices, it is necessary that the pitches between the devices are adjusted, and further that the picking-and-placing operation includes a process of adsorbing a plurality of devices.

In order to compensate the pitches between the user trays and device receiving sections of the boats, adjusting devices such as a pre-sizer, or a link type adjusting device of a hand has been used to adjust the pitches between picking-and-placing cylinders. In order to further increase the testing efficiency, the hand usually includes eight picking-and-placing cylinders and vacuum pads.

The conventional test handlers, however, have shortcomings as follows: when using the pre-sizer, device picking-and-placing efficiency could hardly be good, and when using the link type adjusting device, cumulative errors between the links hinders precise picking-and-placing operation.

Further, when the testing time is relatively shorter than the picking-and-placing time, there occurs cost inefficiency since the heavily invested test device idles.

SUMMARY OF THE INVENTION

The present invention has been made to overcome the above-mentioned problems of the related art, and accordingly, it is an object of the present invention to provide a test handler, i.e., a rambus handler capable of automatically testing rambus type devices such as a Ball Grid Array (BGA) or Chip Size Package (CSP) type devices.

It is another object of the present invention to provide a rambus handler having a displaceable hand which does not incur cumulative error during pitch adjustment between cylinders, and is also capable of handling a plurality of devices in one picking-and-placing operation, thus, reducing picking-and-placing time.

It is still another object of the present invention to provide a rambus handler having a means capable of picking and connecting the devices into test sockets in a stable and accurate manner when picking the devices from test chambers for testing.

The above objects are accomplished by a rambus handler according to the present invention, including a user tray stacker for stacking user trays which are loaded with semiconductor devices for testing, positioning the user trays at a device supplying position one by one, positioning empty user trays at a device receiving position where the empty user trays receive test-completed semiconductor devices, and stacking user trays which are loaded with the test-completed semiconductor devices; a device loading portion having double-row displaceable hands for picking up the semiconductor devices from the user trays at the device supplying position and positioning the semiconductor devices in a boat which is at a device loading position; a heating/cooling chamber for heating or cooling the semiconductor devices on the boats according to the test requirements, while de-elevating the boats to a lower outlet, sequentially, by order of boat receipt from the device loading portion through an upper inlet, and discharging the semiconductor devices through a lower outlet; a test chamber for connecting and testing the heated or cooled semiconductor devices in sockets of a test head; a recovering chamber for recovering the temperature of the semiconductor devices to a normal degree, while elevating and discharging the boats through the upper end by order of boat receipt from the test chamber through a lower end of the test chamber; a device sorting portion having a plurality of single-row displaceable hands for picking the test-completed semiconductor devices from the boats by order of boat receipt from the recovering chamber, and stacking the semiconductor devices in a plurality of predetermined areas of a plurality of conveying buffers corresponding to the respective grades of semiconductor devices sorted by the testing results; and a device unloading portion for stacking the semiconductor devices at the conveying buffers in user trays for the respective grades of the semiconductor devices.

The device loading portion includes a double-axis loading robot attached to the double-row displaceable hands for positioning the double-row displaceable hands above the user trays or the device loading position; and a device buffer for temporarily holding spare semiconductor devices.

The device unloading portion includes a boat conveying shaft for moving the boats in a forward and backward direction, i.e., X-direction to a device adsorbing position; two single-axis orthogonal robots for picking up the devices from the boats with a plurality of single-row displaceable hands and positioning the devices to predetermined areas of conveying buffers corresponding to respective grades of the devices which are evaluated according to the test results; and two conveying buffers for carrying the devices from the boats to the device unloading portion.

The device unloading portion is a double-axis unloading robots attached to a pickup hand which is comprised of a plurality of pickup cylinders.

Further, the above-mentioned objects of the present invention will be accomplished by a single and double-row displaceable hands according to the present invention.

The single-row displaceable hand includes a hand frame; a guiding bar disposed on the hand frame; a plurality of pickup blocks inserted by, and slid on the guiding bar; and pickup block pitch adjusting means for varying the pitches between the guiding bar and the plurality of pickup blocks by being elevated or de-elevated with respect to the hand frame.

The pickup block pitch adjusting means includes guiding protrusions protruding from the plurality of pickup blocks; a pitch adjusting plate having a plurality of guiding grooves formed therein for receiving the guiding protrusions, in a manner such that the guiding protrusions at ends of the guiding grooves indicate narrow pitches between the pickup blocks while the guiding protrusions at the opposite ends indicate wider pitches between the pickup blocks; and driving means for elevating and de-elevating the pitch adjusting plate. Here, the guiding protrusions are formed of cam followers. Further, the pickup block pitch adjusting means is mounted on the hand frame and includes elevation guiding means formed on the hand frame for guiding elevation/de-elevation of the pitch adjusting plate. The elevation guiding means includes a linear motion guide (LM guide) disposed on the hand frame; and a linear motion block (LM block) disposed on the pitch adjusting plate.

The pickup blocks are attached to pickup cylinders for picking-and-placing the devices.

Each of the double-row displaceable hands includes a hand frame; a first guiding bar disposed on the hand frame; a plurality of pickup blocks inserted by, and slid on the first guiding bar; first pitch adjusting means for varying the pitches between the first guiding bar and the plurality of pickup blocks by being elevated or de-elevated with respect to the hand frame; width adjusting means mounted on the hand frame; a second guiding bar disposed on the width adjusting means; a plurality of pickup blocks inserted by, and slid on the second guiding bar; and second pitch adjusting means for varying the pitches between the second guiding bar and the plurality of pickup blocks by being elevated or de-elevated with respect to the hand frame.

The first and second pitch adjusting means include guiding protrusions protruding from the plurality of pickup blocks; first and second pitch adjusting plates having a plurality of guiding grooves formed therein for receiving the guiding protrusions in a manner that the guiding protrusions at one ends of the guiding grooves indicate narrow pitches between the pickup blocks while the guiding protrusions at opposite ends of the guiding grooves indicate wider pitches between the pickup blocks; and first and second driving means for elevating or de-elevating the first and second pitch adjusting plates.

The first pitch adjusting means includes first elevation guiding means mounted on the hand frame, for guiding the elevation and de-elevation of the first pitch adjusting plate, and, the second pitch adjusting plate comprises second elevation guiding means mounted on the width adjusting means, for guiding the elevation or de-elevation of the second pitch adjusting plate.

The width adjusting means includes a pneumatic cylinder mounted on the hand frame; a width adjusting bracket connected to an end of a rod of the pneumatic cylinder; a plurality of linear motion blocks mounted on the width adjusting bracket; and a plurality of linear motion guides mounted on the hand frame in a perpendicular relation with respect to the first guiding bar, for guiding the movement of the linear motion block.

The above objects are also accomplished by a rambus handler according to the present invention, having the test chamber including a boat loaded with a plurality of semiconductor devices for testing; a contact picker assembly for picking and directly connecting the semiconductor devices from the boats to the test sockets of the test head; elevating means for vertically moving the contact picker assembly; and boat conveying means for moving the boats so that the contact picker assembly can pick and de-elevate the semiconductor devices from the boats to the test sockets.

The boat is loaded with a plurality of semiconductor devices at the device loading portion, and moved to the initial test position above the test head. The boat has a plurality of device receiving holes and a plurality of piercing holes formed between the device receiving holes. Through the piercing holes of the boat, the contact picker assembly de-elevates to the test sockets and directly connects the devices to the test sockets for testing. Meanwhile, the boat is moved from the initial test position by the boat conveying means across the piercing holes of the boat to a distance corresponding to a half pitch of the device receiving hole.

The contact picker assembly includes an elevating plate connected to the elevating means; a plurality of pickers connected to the elevating plate via a shock absorbing means, and comprised of four rectangular picking members which have vacuum holes; a vacuum pad movably connected to each picker member to adsorb the devices; and a plurality of compression coil springs disposed between each picker member and vacuum pad to elastically support the vacuum pad downward.

The shock absorbing means includes a first shock absorbing plate connected to upper portion of each picker; a second shock absorbing plate connected to the elevating plate corresponding to the first shock absorbing plate; a plurality of connecting bars for connecting the first and second shock absorbing plates in a manner that the first shock absorbing plate is movable with respect to the second shock absorbing plate within a predetermined range; and a plurality of compression coil springs disposed around the plurality of connecting bars for elastically supporting the first shock absorbing plate to the second shock absorbing plate.

The contact picker assembly elevating means includes a motor mounted on an upper portion of a frame which is mounted on the contact picker assembly; a rack bar protruding upright from the upper center portion of the contact picker assembly through the frame, and having a rack engaged with the pinion in a lengthwise direction for moving vertically as the motor operates; and guiding means for guiding the elevation/de-elevation of the contact picker assembly.

The boat conveying means includes a gripping member pivotally disposed adjacent to the boat, for gripping the boat by being selectively inserted in a gripping hole formed on one side of the boat; a pivoting portion for pivoting the gripping member until the gripping member is inserted in the gripping hole; and a driving portion for linearly moving the gripping member which grips the boat by the operation of the pivoting portion.

The pivoting portion includes a pivoting bar for pivotally supporting the gripping member; a pivoting block connected to an end of the pivoting bar; and a pneumatic cylinder for pivoting the pivoting block. The driving portion includes a motor; a ball screw engaged with a shaft of the motor; a ball nut engaged with the ball screw for linearly moving along with the rotational movement of the ball screw; and a connecting member for connecting the ball nut and the pivoting portion.

According to a preferred embodiment of the present invention, the test chamber of the rambus handler includes a picking position guiding means for guiding the vacuum pads of the contact picker assembly to accurate positions in the device receiving holes when the contact picker assembly picks the semiconductor devices; de-elevation guiding means for guiding the contact picker assembly when the contact picker assembly de-elevates to connect the semiconductor devices to the test sockets; and connecting guiding means for guiding the vacuum pads of the contact picker assembly to accurate positions in the test sockets when the contact picker assembly connects the semiconductor device to the test sockets.

The picking position guiding means includes first and second slope guiding portions correspondingly formed on left and right sides and on both sides of the device receiving holes of the vacuum pads, for guiding an X-directional movement of the vacuum pads in the device receiving holes; and first and second hard stop contacting portions of a predetermined radius of curvature, correspondingly formed on front and rear sides, and on both sides of the device receiving holes of the vacuum pads, for guiding an Y-directional movement of the vacuum pads in the device receiving holes.

The de-elevation guiding means includes a plurality of pairs of contact guiding pins integrally formed on the contact picker assembly; and a contact guide plate disposed on an upper portion of the test head, the guiding plate having a contact guiding pin holes corresponding to the contact guiding pins.

The connection guiding means includes third slope guiding portions formed on both side walls of the test sockets corresponding to the first slope guiding portions of the vacuum pads, for guiding an X-directional movement of the vacuum pads; and third hard stop contacting portions formed on both sides of the test sockets corresponding to the first hard stop contacting portions of the vacuum pads, for guiding an Y-directional movement of the vacuum pads.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, and wherein:

FIGS. 6A and 6B are views for showing varying pitches between the pickup cylinders of the single-row displaceable hand of FIG. 5, in which FIG. 6A shows the pitches being narrowed, while FIG. 6B shows the pitches being widened;

FIGS. 10A, 10B, and 10C are views for showing the structure of the boat according to the present invention, in which FIG. 10A is a plan view, and FIGS. 10B and 10C are sectional views taken on lines I—I and II—II of FIG. 10A, respectively;

DETAILED DESCRIPTION OF THE PREFERRED EMBODIMENTS

Reference will now be made in detail to the preferred embodiments of the present invention, examples of which are illustrated in the accompanying drawings.

Figure 1:
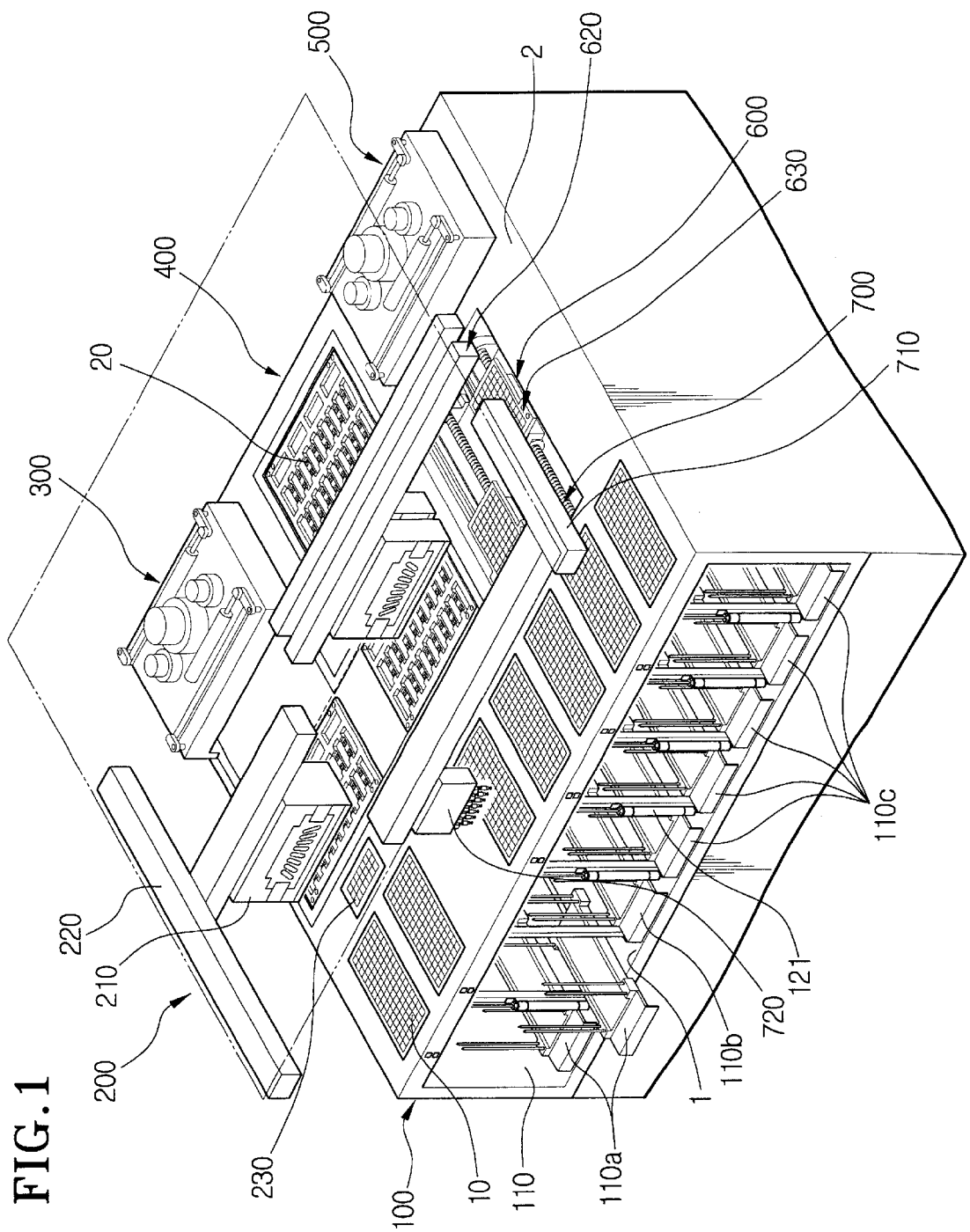
FIG. 1 is a perspective view for showing a rambus handler according to a preferred embodiment of the present invention.

As shown in FIG. 1, the rambus handler according to the present invention includes a user tray stacker 100, device loading section 200, heating/cooling chamber 300, test chamber 400, recovering chamber 500, device sorting section 600, and device unloading section 700.

Hereinafter, throughout the description of the preferred embodiment of the present invention, it will be defined that an X-direction is the direction along which tray racks are disposed on the upper front portion of a main frame 1, while an Y-direction is the direction running toward the rear portion of the main frame 1 in a perpendicular relation with the X-direction. Reference is also particularly made to FIG. 4 for showing the conveyance of the devices 60 of the rambus handler.

Figure 2:
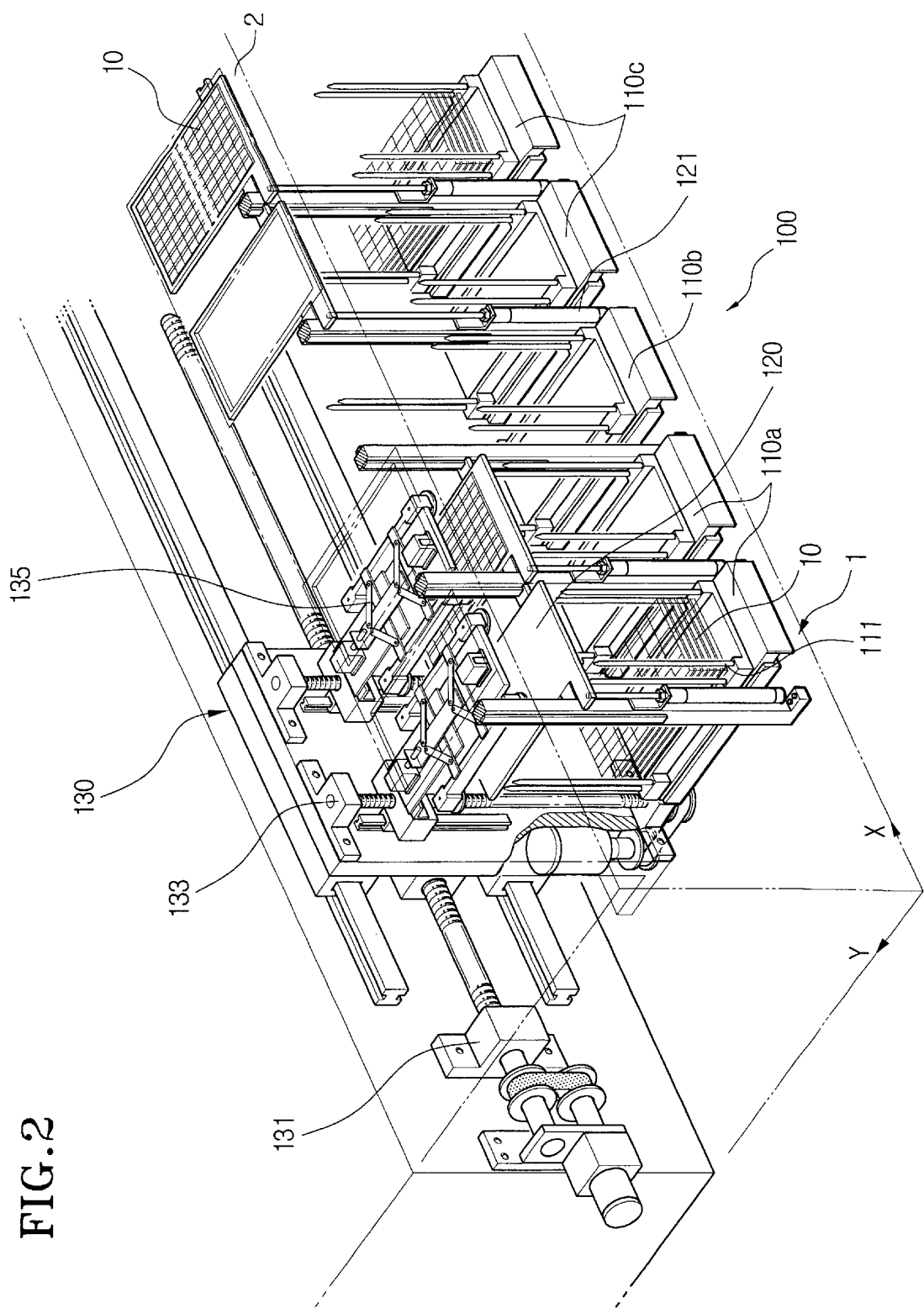
FIG. 2 is a perspective view for showing a user tray stacker of FIG. 1.

The user tray stacker 100 is disposed on the upper front portion of the main frame 1, and as shown in FIG. 2, the user tray stacker 100 includes tray racks 110 for stacking the user trays 10, tray fixing plates 120 for fixing the user trays 10 one by one, and a tray robot 130 for loading/unloading the user trays 10. Further, on the upper side of the user tray stacker 100, a base plate 2 is mounted.

The tray racks 110 are plates which have guiding bars 111, and stack the user trays 10 one by one. The tray racks 110 are forward-and-backward movable in the Y-direction by cylinders. A plurality of tray racks 110 are disposed on the upper front portion of the main frame in a single row, including two tray racks 110a for stacking the user trays 10 loaded with the devices 60 for testing, one tray rack 110b for stacking empty user trays 10, and five tray racks 110c for stacking the user trays 10 loaded with the devices 60 which are sorted according to the test results.

The tray fixing plates 120 are disposed above the tray racks 110 and below the base plate 2, corresponding to each one of the tray racks 110 except the tray rack 110b loaded with the empty user tray 10. The tray fixing plates 120 are elevated/de-elevated by the cylinders 121. Accordingly, when the tray fixing plates 120 are elevated with the user trays 10 loaded thereon, the user trays 10 are fit in and exposed through openings formed in the base plate 2, forming device supply position P1 and device receiving position P6.

The tray robot 130 is an orthogonal robot having an X-direction axis 131 and two vertical-direction axes 133. The vertical-direction axes 133 have grippers 135, respectively, for loading/unloading the user trays 10 between the tray fixing plates 120 and the tray racks 110. The operational area of the tray robot 130 covers whole tray racks 110.

The device loading section 200 adsorbs the devices 60 from the user trays 10 fixed in the device supply position P1 and accommodates the devices 60 in the receiving openings of boats 20 located in the device loading position P2. The device loading section 200 includes double-row displaceable hands 210, loading robots 220, and device buffers 230.

Each double-row displaceable hand 210 includes sixteen pickup cylinders 286 and 296 which are arranged in a manner that the eight pickup cylinders 286 and 296 are arranged in two rows. The pitches of the respective cylinders 286 and 296 vary from narrow to wide ranges. The narrow pitches indicate that the devices 60 are picked up from the user trays 10, while the wide pitches indicate the devices 60 are laid on the boats 20. This will be described in greater detail later.

The loading robot 220 is a double-axis cartesian coordinate robot which has displaceable hands 210 and move in X and Y directions. The loading robot 220 is disposed at a proper height to cover the operation area of the user trays 10 in the device supplying position P1 and the boats 20 in the device loading position P2.

The device buffers 230 are disposed between the device supplying position P1 and the device loading position P2, having a plurality of device receiving openings formed therein. The device buffers 230 always have two spare devices 60, enabling the double-row displaceable hands 210 to adsorb and convey sixteen devices 60 at all times.

The heating/cooling chamber 300 is located in the upper rear portion of the main frame 1, and has an inlet having the same height as the device loading position P2 in order for the boat 20 to enter therethrough, and an outlet having the same height as the upper surface of the main frame 1 in order for the boat 20 to exit therethrough. Accordingly, the inlet and outlet of the heating/cooling chamber 300 are at different heights. As the boat 20 enters into the heating/cooling chamber 300 and de-elevated toward the outlet, the devices 60 on the boat 20 are properly heated or cooled according to test requirements.

The test chamber 400 is formed in the main frame 1, and connectively formed next to the outlet of the heating/cooling chamber 300, to connect the devices 60 to the plurality of test sockets of the test heads located beneath the upper side of the main frame 1 for testing. The test chamber 400 will be described in greater detail later.

The recovering chamber 500 is connectively disposed next to the test chamber 400. The recovering chamber 500 elevates the boat 20, which comes out of the test chamber 400, to the height corresponding to the device loading position P2, and recovers the temperature of the device to a normal temperature. Inlet of the recovering chamber 500 is at the same height as the outlet of the heating/cooling chamber 300, while the outlet thereof is formed at the same height as the device loading position P2.

The outlet of the heating/cooling chamber 300, testing position and conveyance path of the boats 20 at the test chamber 400, and inlet of the recovering chamber 500 are all at the same height. The boats 20 are conveyed among the respective chambers by a boat conveying device having ball screws and pneumatic cylinders.

Figure 3:
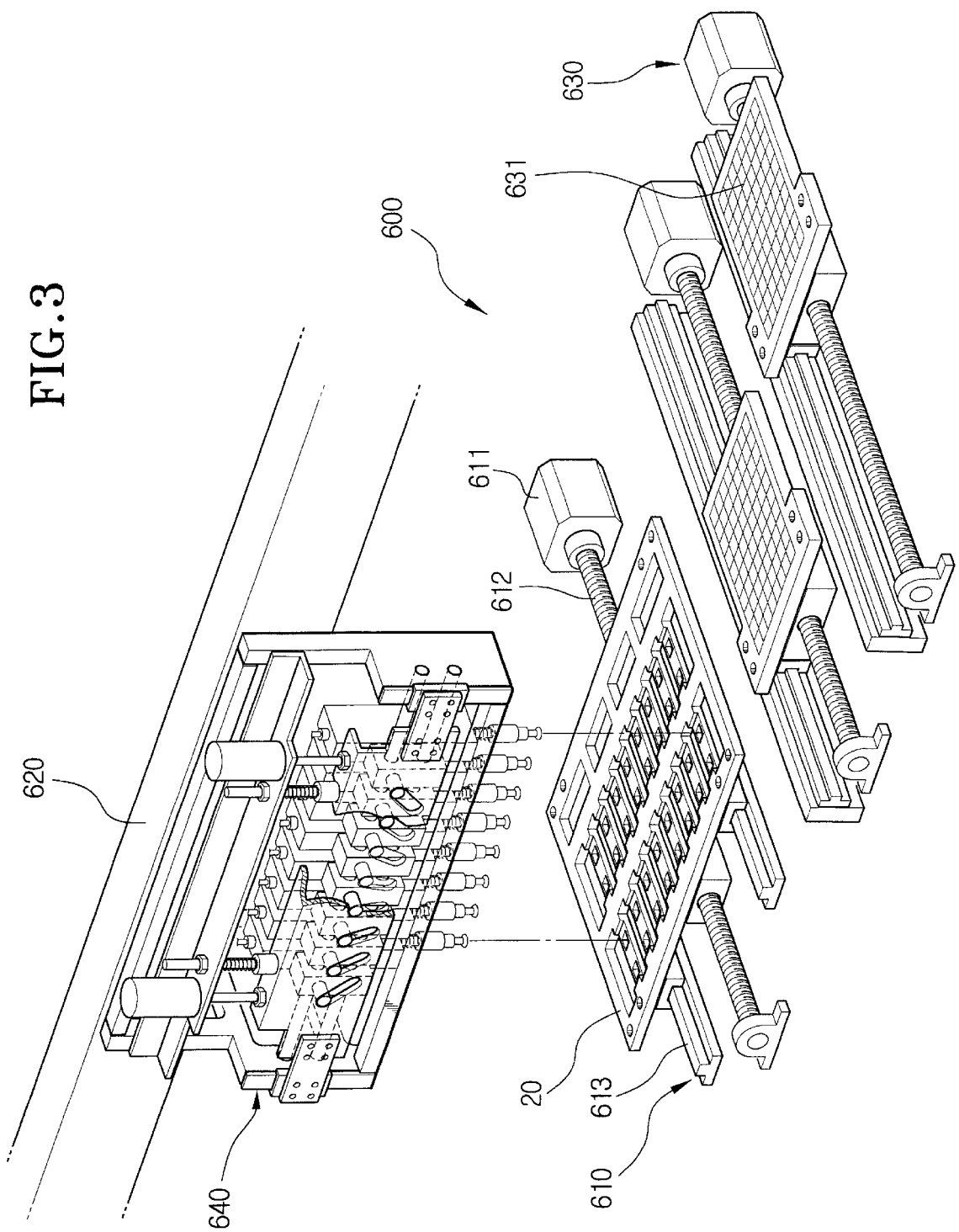
FIG. 3 is a perspective view for showing a device sorting section of FIG. 1.

As shown in FIG. 3, the device sorting section 600 includes a boat conveying shaft 610, two single-axis robots 620, two conveying buffers 630, and a single-row displaceable hand 640.

After receiving the boat 20 from the outlet of the recovering chamber 500, the boat conveying shaft positions the boat 20 properly. The boat conveying shaft 610 includes a motor 611, ball screw 612, and linear motion guide (LM guide) 613.

The single-axis robots 620 are disposed on the boat conveying shaft 610 and the conveying buffers 630, and pick-and-place the devices 60 of the boats 20 to the conveying buffers 630. Each single-axis robot 620 has eight pickup cylinders 652 which are attached with a single-axis displaceable hand 640 for varying the pitches between the cylinders 652. This will be described in greater detail later.

The conveying buffers 630 are disposed beside the boat conveying shaft 610. Conveying plates 631 of the conveying buffers 630 are forward-backward moved by a linear conveying means, and have a plurality of sections for receiving and stacking the devices 60. The linear conveying means includes a motor, ball screw, and LM guide. Accordingly, after the testing of the devices 60, the conveying buffers 630 convey the devices 60 toward the user tray stackers 100, more specifically to the device unloading position P5.

Further, the device sorting section 600 includes a first section for receiving the boat 20 from the recovering chamber 500, and a second section for conveying the boat 20, which is emptied as the devices 60 thereon are picked and placed to the conveying buffers 630, to the device loading position P1 of the device loading section 200. The first and second sections are generally formed of pneumatic cylinders.

The device unloading section 700 grades, groups, and stacks the devices 60 of the conveying buffers 630 according to the test results in the user trays 10 fixed in the device receiving position P6. The device unloading section 700 includes a double-axis unloading robot 710 (a Cartesian coordinate robot) attached to the pickup hand 720 for moving in the X and Y directions.

The unloading robot 710 is disposed at the proper height to cover the device unloading position P5 of the two conveying buffers 630 and the user trays 10 in the device receiving position P6 within its operation area.

The pickup hand 720 includes sixteen pickup cylinders 286 and 296. Since the pitches between the device receiving sections of the conveying buffers 630 and between the user trays 10 are identical with each other, the pitches between the pickup cylinders 286 and 296 do not vary. In case when the pitches between the device receiving sections vary, the displaceable hand may be used.

Further, albeit not explained, a controlling section is included in this embodiment to control the respective sections.

Hereinafter, the operation of the rambus handler according to the preferred embodiment of the present invention will be described in greater detail.

A worker stacks the user trays 10 loaded with the devices 60 in the supply tray racks 110*a* which are in advanced position. After the stacking, the tray racks 110*a* are returned to the initial position. Further, the empty user trays 10 without the devices 60 are stacked in the empty tray rack 110*b* in number at least the same as the number of device grade groups.

When the user trays 10 are stacked in the tray racks 110, the tray robot 130 detects the position of the upper-most user tray 10 of the user trays 10 in the supply tray racks 110*a*, grips the upper-most user tray 10 with the grippers 135 and escapes to above the neighboring tray racks 110*a*. Then, the tray fixing plates 120 are de-elevated to the proper height that could enable the grippers 135 of the tray robot 130 to load/unload the user trays 10. When the tray fixing plates 120 are de-elevated, the user trays 10 gripped by the tray robot 130 are loaded on the tray fixing plates 120. When the tray robot 130 loads the user trays 10 and escapes, the tray fixing plates 120 are elevated to fit in the user tray 10 and thus expose the user tray 10 through the opening in the base plate 2, forming the device supplying position P1.

If there is the user tray 10 on the tray fixing plates 120, the tray robot 130 unloads the user tray 10 from the tray fixing plate 120 with the gripper unoccupied with the user tray 10, and then proceeds the above-described operations. After unloading the user tray 10 from the tray fixing plate 120, the tray robot 130 selectively stacks the user tray 10 either in the empty tray rack 110*a* or in the other tray racks 110*c* stacked with the test completed devices 60.

When the user trays 10 arrive the device supplying position P1, the loading robot 220 adsorbs the device with the double-row displaceable hand 210, and stacks the device in the boat 20 at the device loading position P2. Here, the double-row displaceable hand 210 adsorbs the devices 60 from the user tray 10 with narrowed pitches among the pickup cylinders 283 and 296. While the double-row displaceable hand 210 moves to the device loading position P2, the pitches of the pickup cylinders 286 and 286 are widened, and the devices 60 are positioned on the boat 20 properly.

If there is a shortage of adsorbed devices 60 from sixteen, it is made up by a proper process, such as un-adsorbing the devices 60 back to the device buffers 230, or adsorbing corresponding number of devices 60 from the device buffers 230 to make up sixteen devices 60. When there is a shortage of device adsorbed by the displaceable hand 210 with no device left on the device buffers 230, the displaceable hand 210 un-adsorbs the devices 60 back to the device buffers 230.

After completely loading the devices 60 on the boat 20 in the device loading position P2, the loading robot 220 drags the boat 20 to the heating/cooling chamber 300 with guiding bars formed on the lower end of the displaceable hand 210. Next, rotary cylinders formed in front of the inlet of the heating/cooling chamber 300 completely put the boat 20 into the heating/cooling chamber 300.

As one boat 20 enters into the heating/cooling chamber 300, another boat 20 at the lowest position exits out to the test chamber 400. More specifically, the inlet and outlet of the heating/cooling chamber 300 are at different heights, and a plurality of boats 20 are stacked therebetween. Accordingly, as one boat 20 enters the heating/cooling chamber 300, another boat 20 exits from the heating/cooling chamber 300 sequentially. Since it takes a certain time for the boats 20 in the heating/cooling chamber 300 to exit, the boats 20 are heated or cooled properly until each exits.

After exiting from the heating/cooling chamber 300, the boat 20 is positioned on the test head of the test chamber 400. Then, the picker assembly of the test chamber 400 pick and connect the thirty two devices 60 to the sockets of the test head for the testing. The controller of the handler memorizes the grades of the devices 60 on the boat 20 which are measured according to the test results. After the testing, the boat 20 enters the recovering chamber 500. Testing process in the test chamber 400 will be described in greater detail later.

Like the heating/cooling chamber 300, the inlet and outlet of the recovering chamber 500 are at different heights. Accordingly, the temperature of the devices 60 on the boats are returned to a normal degree in the recovering chamber 500, while the boats 20 are sequentially entered and discharged through the inlet and outlet. An exception of the test chamber 400 with respect to the heating/cooling chamber 300 is that the outlet is higher than the inlet, and the boats 20 exit above the test chamber 400.

After exiting from the recovering chamber 500, the boats 20 are stacked on the boat conveying shaft 610 of the device sorting section 600. The boat conveying shaft 610 conveys the boats 20 forward and backward (i.e., in Y-direction) and stops at the position P3 where the single-axis robots 620 adsorb the devices 60 from the boats 20.

Each single-axis robot 620 adsorbs eight devices 60 from the boat 20 with the single-row hand 640, conveys the devices 60 in X-direction, and positions the devices 60 in the device receiving sections of the conveying buffers 630 at a device receiving position P4 according to the grades of the devices 60 determined by the test results. Since there are area allotment for the respective grade groups of devices 60 in the handler controller, the devices 60 adsorbed by the single-axis robots 620 can be received in the proper area of the conveying buffers 630 according to the test results memorized by the controller. This process is performed by the cooperation of the X-direction movement of the single-axis robots 620 and the Y-direction movement of the conveying buffers 630. When the devices 60 are drawn by the single-axis robot 620, the emptied boat 20 is moved to the device loading position P2 by the boat conveying shaft 610.

The conveying buffer 630 loaded with the devices 60 are conveyed to the device unloading position P5 by the linear conveying means which is formed of ball screws. There are two conveying buffers 630 for uninterrupted testing operation. Accordingly, while one conveying buffer 630 is moved to the device unloading position P5, the other conveying buffer 630 continues receiving and grouping the respective grades of devices 60 from the device sorting section 600.

When the conveying buffers 630 move to the device unloading position P5, the unloading robot 710 adsorbs the devices 60 from the conveying buffers 630 with the pickup hand 720 formed of sixteen pickup cylinders, and stacks the respective grade groups of the devices 60 into corresponding user trays 10 formed at the device receiving position P6. Accordingly, the devices 60 at the first, second, . . . , defective grade areas of the conveying buffers 630 are stacked in the user trays 10 for first, second, . . . , defective grade devices 60, respectively.

Figure 4:
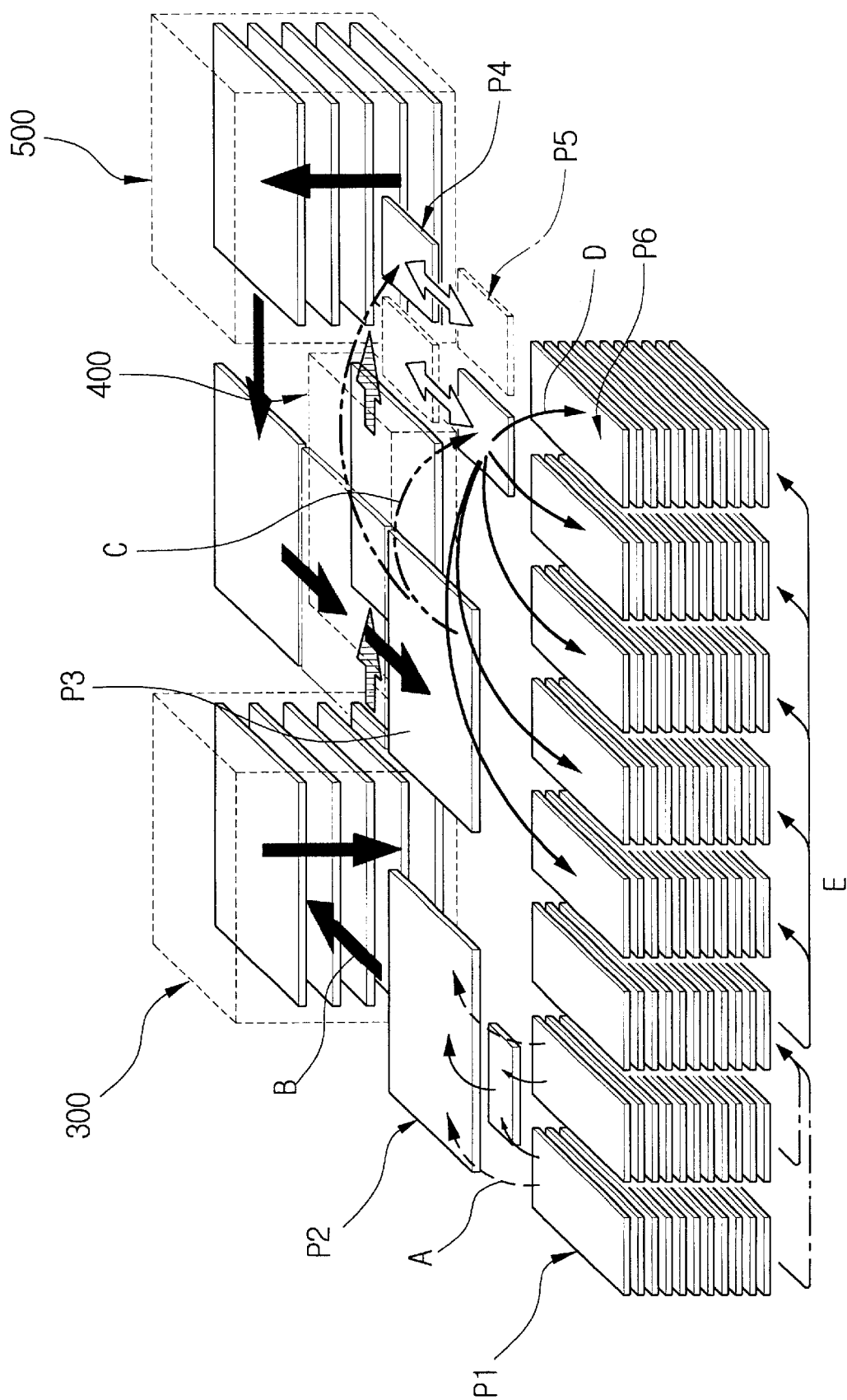
FIG. 4 is a diagram for showing the conveyance path of the devices in the rambus handler of FIG. 1.

FIG. 4 is a flow diagram for showing the conveyance path of the devices 60 in the rambus handler according to the preferred embodiment of the present invention. The devices 60 in the user tray 10 at the device supplying position P1 are adsorbed by the double-row displaceable hand 210 sixteen by sixteen, and received on the boat 20 in the device loading position P2 (shown in arrow A). When the devices 60 are completely received on the boat 20, the boat 20 is conveyed to the heating/cooling chamber 300, test chamber 400, recovering chamber 500, and the device sorting section 600 (shown in arrow B). When the boat 20 is conveyed to the device sorting section 600, the respective grades of devices 60 are received at the correspondingly allotted areas by the two single-row displaceable hands 640 (shown in arrow C). The emptied boat 20 is then conveyed to the device loading position P2. When the conveying buffers 630 are moved to the device unloading position P5, the respective grades of the devices 60 are loaded from the conveying buffers 630 to the corresponding user trays 10 by the fixed hand 720 (shown in arrow D).

An arrow E shows the movement path of the user trays 10. As shown, the emptied user tray 10 is moved to be loaded with test completed devices 60.

Hereinafter, the single-row displaceable hand 640 and the double-row displaceable hand 210 according to the present invention will be described in greater detail.

Figure 5:
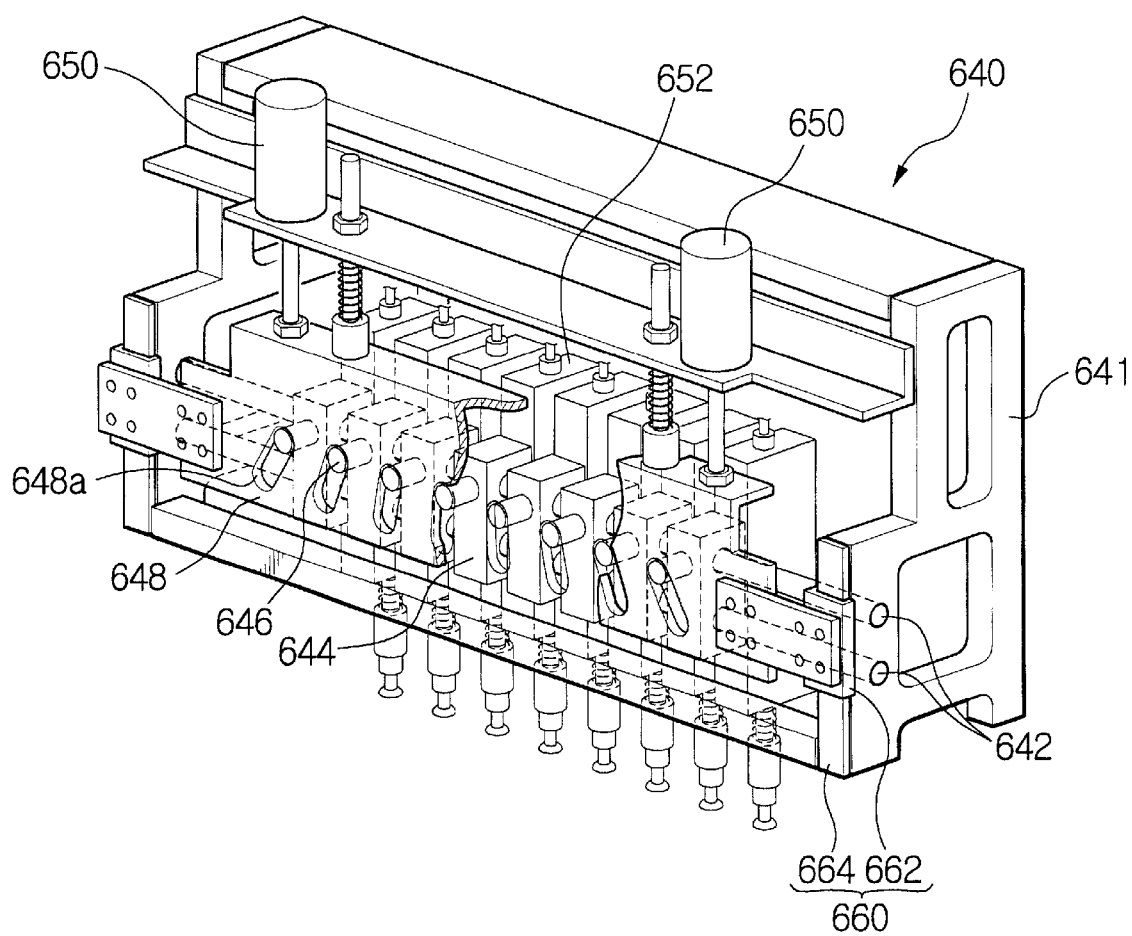
FIG. 5 is a perspective view for showing a single-row displaceable hand of FIG. 1.

As shown in FIG. 5, the single-row displaceable hand 640 according to the preferred embodiment of the present invention includes a hand frame 641, guiding section 642, a plurality of pickup blocks 644, a plurality of pickup cylinders 652, and pickup cylinder pitch adjusting means.

The guiding section 642 includes two rods which are fixed to both ends of the hand frame 641 at a predetermined distance from each other, while a plurality of pickup blocks 644 are slidably pierced by the guiding rods 642.

The pickup block pitch adjusting means includes guiding protrusions protruding from a plurality of pickup blocks 644, a pitch adjusting plate 648, driving means 650, and guiding means 660.

The pitch adjusting plate 648 includes a plurality of guiding grooves 648a for receiving the guiding protrusions 646. The guiding protrusions at one ends of the plurality of guiding grooves 648a indicates the contraction of the pickup blocks 644, while the guiding protrusions at the other ends of the plurality of guiding grooves 648a indicates extension of the pickup blocks 644.

The driving means 650 elevates the pitch adjusting plate 648, and includes two pneumatic cylinders. At both upper ends of the pitch adjusting plate 648, rods of the pneumatic cylinders are fixed, while the bodies thereof are fixed to the hand frame 641.

The guiding means 660 guides the elevation/de-elevation of the pitch adjusting plate 648 when the pitch adjusting plate 648 is elevated or de-elevated by the driving means 650. The guiding means 660 includes linear motion guides 664 and motion blocks 662. The linear motion guides 664 are formed on both ends of the hand frame 641, while the linear motion blocks 662 are formed on both ends of the pitch adjusting plate 648 for guiding linear elevation/de-elevation.

Further, on both sides of each pickup block 644, pickup cylinders 652 are mounted for adsorbing and conveying a certain number of devices 60 (not shown).

The operation of the single-row displaceable hand 640 will be described in greater detail below.

Figure 6A:
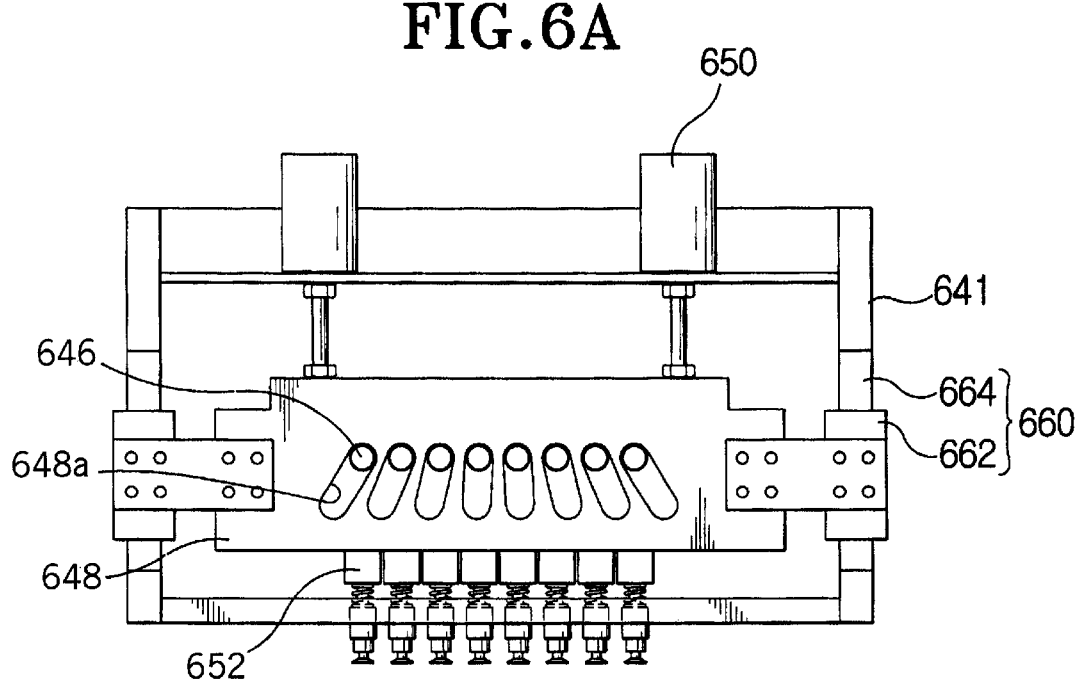

When conveying the densely arrange devices 60 to the less dense state, such as conveying the devices 60 from the user tray 10 to the boat 20, the single-row displaceable hand 640 is used as follows:

As shown in FIG. 6A, the single-row displaceable hand 640 is initially in tight contact with the pickup blocks 644. As the rods of the pneumatic cylinders of the driving means 650 are elevated, the pitch adjusting plate 648 attached to the rods are moved upward along the linear motion guides 664. Accordingly, a plurality of guiding grooves 648a formed in the pitch adjusting plate 648 are also elevated, and the guiding protrusions 646 received in the guiding grooves 648a are moved in the guiding grooves 648a, widening the pitches between the guiding protrusions 646.

The guiding protrusions 646 include cam followers, which are attached to a plurality of pickup blocks 644. Since the pickup blocks 644 are slidably pierced by the guiding rods 642, the pickup blocks 644 slid along the guiding rods 642 by the elevating movement of the pitch adjusting plate 648, widening the pitches between the pickup blocks 644 as much as the horizontal distance of the movement of the guiding protrusions 646.

Figure 6B:
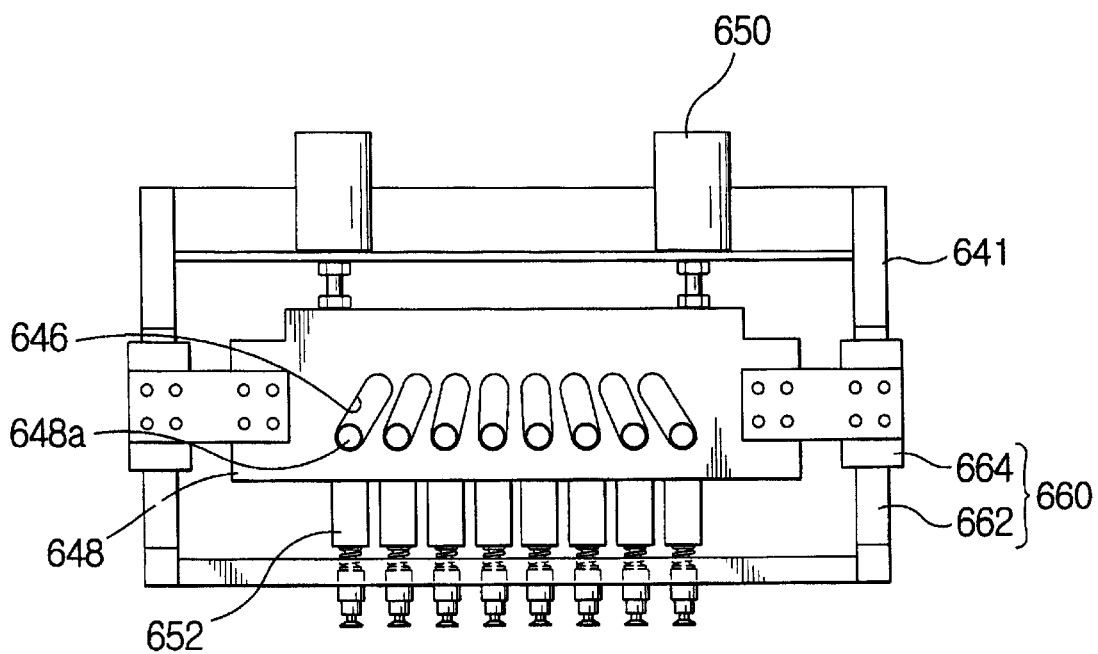

That is, as shown in FIG. 6B, the single-row displaceable hand 640 un-adsorbs the devices 60 in a state that the pitches between the devices 60 are widened.

Figure 7:
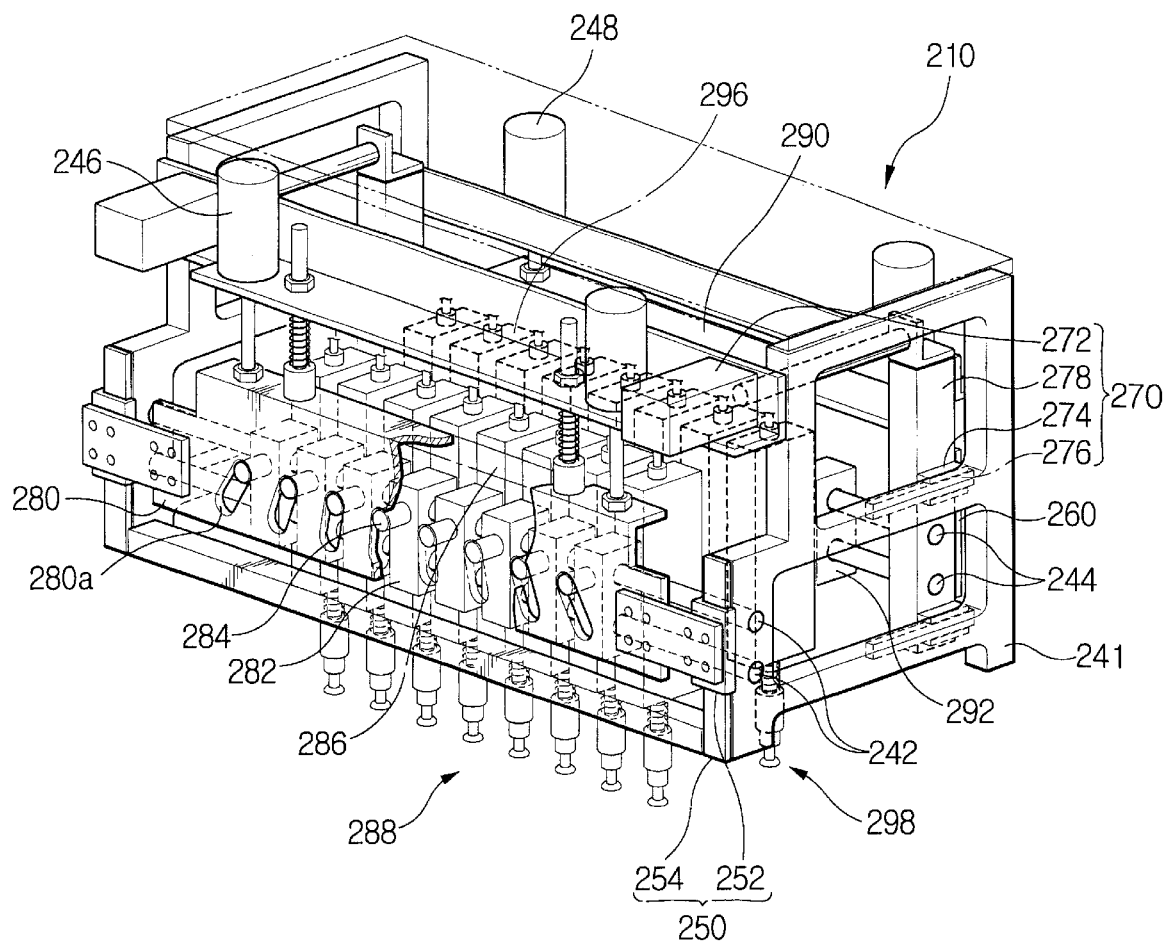
FIG. 7 is a perspective view for showing a double-row displaceable hand.

FIG. 7 is a perspective view for showing the double-row displaceable hand according to another preferred embodiment of the present invention.

In the second preferred embodiment, as shown in FIG. 7, a plurality of pickup cylinders are arranged in two rows, capable of varying the pitches therebetween.

The double-row displaceable hand 210 mainly includes a hand frame 241, first and second guiding rods 242 and 244, a plurality of pickup blocks 282, first and second pitch adjusting means, and width adjusting means 270.

The first guiding rod 242 includes two guiding rods 242 which are fixed to both ends of the hand frame 241 at a predetermined distance therebetween, while a plurality of pickup blocks 282 are slidably pierced by the two first guiding rods 242.

The first pitch adjusting means includes guiding protrusions 284 protruding from a plurality of pickup blocks 282, first pitch adjusting plate 280, first driving section 246, and first elevation guiding section 250.

The first pitch adjusting plate 280 has a plurality of guiding grooves 280a for receiving the guiding protrusions 284, respectively. The plurality of guiding grooves 280a at one ends of the guiding grooves 280a indicates a narrow pitches between the pickup blocks 282, while the guiding protrusions 280a at the other ends of the guiding grooves 280a indicates a wide pitches between the pickup blocks 282.

The first driving section 246 elevates the first pitch adjusting plate 280, and includes two pneumatic cylinders. Rods of the pneumatic cylinders are fixed at both upper sides of the first pitch adjusting plate 280, while the bodies thereof are fixed on the hand frame 241.

The first elevation guiding section guides the elevation/de-elevation of the first pitch adjusting plate 280 when the first pitch adjusting plate 280 is elevated by the first driving section 246. The first elevation guiding section 250 includes linear motion guides 254 and linear motion blocks 252. The linear motion guides 254 are disposed on both ends of the hand frame 241, while the linear motion blocks 252 are disposed on both ends of the first pitch adjusting plate 280 for guiding linear movement of the first pitch adjusting plate 280.

The width adjusting section 270 includes two pneumatic cylinders 272, four linear motion guides 276 and linear motion blocks 274, and sub-frame 278. The linear motion guides 276 are formed on the hand frame 241 in a perpendicular relation with respect to the first guiding rods 242. Here, the linear motion guides 276 are disposed on both sides of the hand frame 241, one above and the other below the first guiding rods 242. The linear motion guides 276 are connected with the linear motion blocks 274, respectively, while the linear motion blocks 274 are connected with the sub-frame 278. To both upper sides of the sub-frame 278, rods of two pneumatic cylinders 272 are connected, respectively, while the pneumatic cylinders 272 are fixed on the hand frame 241.

The second guiding rod 244 includes two guiding rods 244 are fixed on the sub-frame 278 at a predetermined distance from each other. That is, both ends of each second guiding rod 244 are fixed on the sub-frame 278. The pickup blocks 292 are slidably pierced by the two second guiding rods 244.

The second pitch adjusting means includes guiding protrusions protruding from the pickup blocks 292, respectively, second pitch adjusting plate 290, second driving section 248, and second elevation guiding section 260.

The second pitch adjusting plate 290 includes a plurality of guiding grooves for receiving the guiding protrusions. The guiding protrusions at one ends of the guiding grooves indicates narrow pitches between the pickup blocks 292, while the guiding protrusions at the other ends of the guiding grooves indicates wide pitches between the pickup blocks 292.

The second driving section 248 elevates the second pitch adjusting plate 290, and includes two pneumatic cylinders. Rods of the pneumatic cylinders are fixed on both upper sides of the second pitch adjusting plate 290, while the bodies thereof are fixed on the sub-frame 278.

The second elevation guiding section 260 guides the elevation of the second driving section 248, when the second pitch adjusting plate 290 is elevated by the second driving section 248. The second elevation guiding section 260 includes linear motion guides and linear motion blocks.

Here, the linear motion guides are disposed on both ends of the sub-frame 278, while the linear motion blocks are disposed on both ends of the second pitch adjusting plate 290 for guiding the linear movement of the second pitch adjusting plate 290.

Further, on the respective sides of the pickup blocks, pickup cylinders 286 and 286 are mounted for adsorbing and conveying a certain number of devices 60.

Hereinafter, the operation of the double-row displaceable hand according to the preferred embodiment of the present invention will be described in greater detail.

Here, since varying the pitches between the pickup cylinders is described above when describing the operation of the single-row displaceable hand 640, the description will now be focused on the operation for varying the pitches between the first pickup cylinders 288 and between the second pickup cylinders 298.

When the rods of the pneumatic cylinders 272, which are fixed on the hand frame 241, are advanced, the sub-frame 278 connected to the rods of the pneumatic cylinders 272 are linearly moved along the linear motion guides 276, to thereby widen the pitches between the first pickup cylinders 288 and between the second pickup cylinders 298. When the rods of the pneumatic cylinders 272 are retreated, the pitches between the first pickup cylinders 288 and between the second pickup cylinders 298 are narrowed.

Although there is no limit for the number of pickup cylinders 288 and 298, it is preferable that eight cylinders be arranged in each of two rows, i.e., sixteen cylinders are preferred to be used as in this embodiment.

Finally, the testing means provided to the test chamber of the rambus handler and its operation and effect according to the present invention will be described in greater detail.

Figure 8:
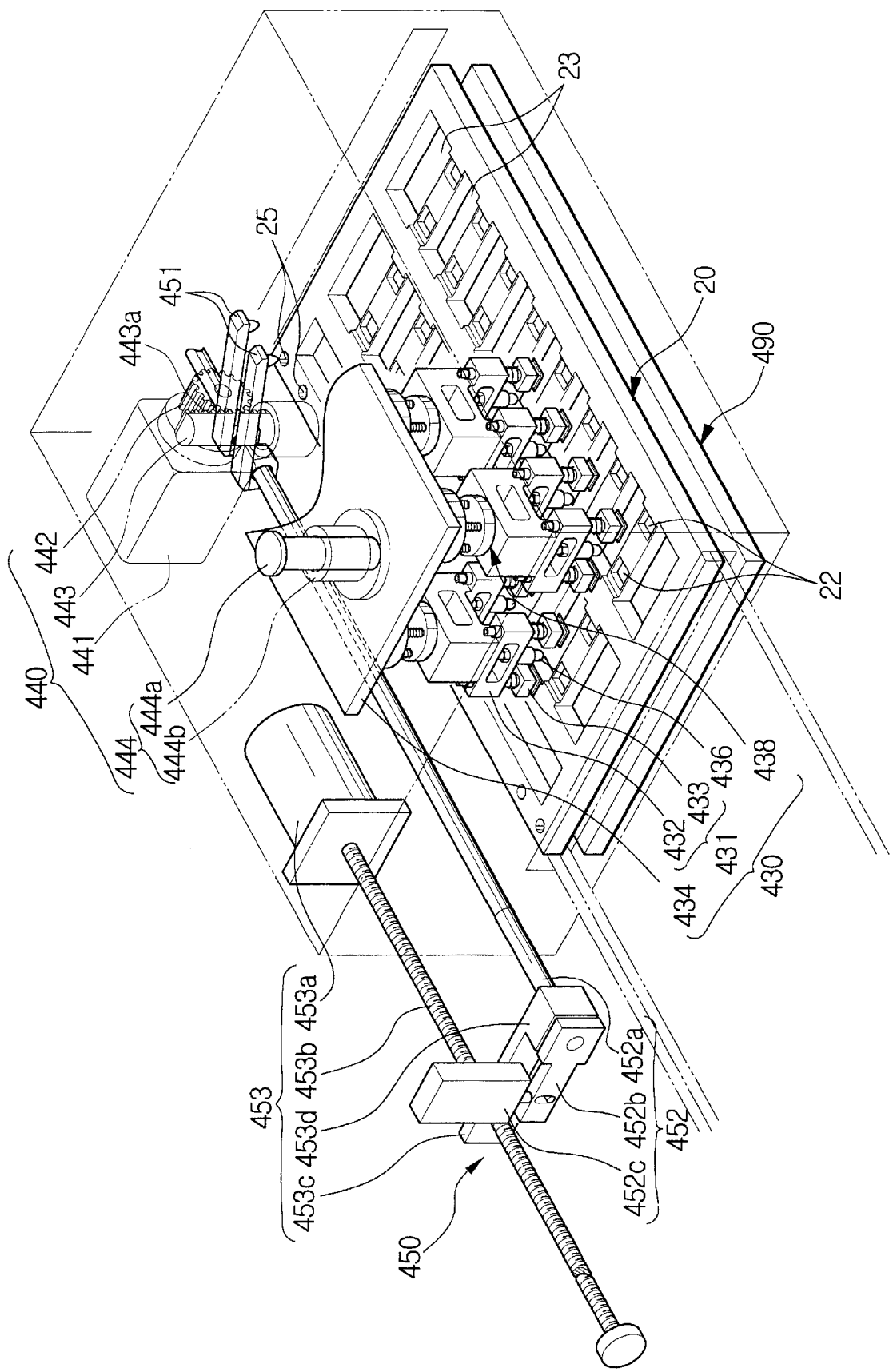
FIG. 8 is a perspective view for schematically showing test chambers of the rambus handler according to the preferred embodiment of the present invention.
Figure 9A:
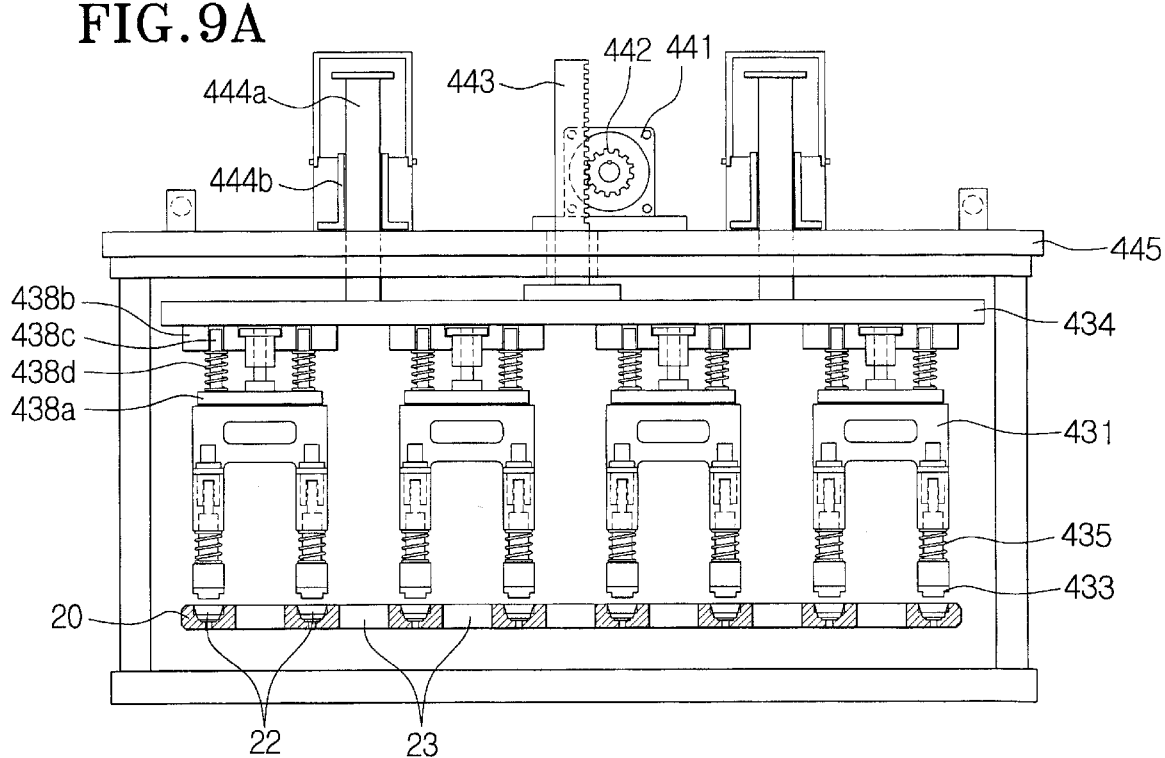
FIGS. 9A and 9B are front and side views, respectively, for showing the structure of the test chambers of FIG. 8 in detail.
Figure 9B:
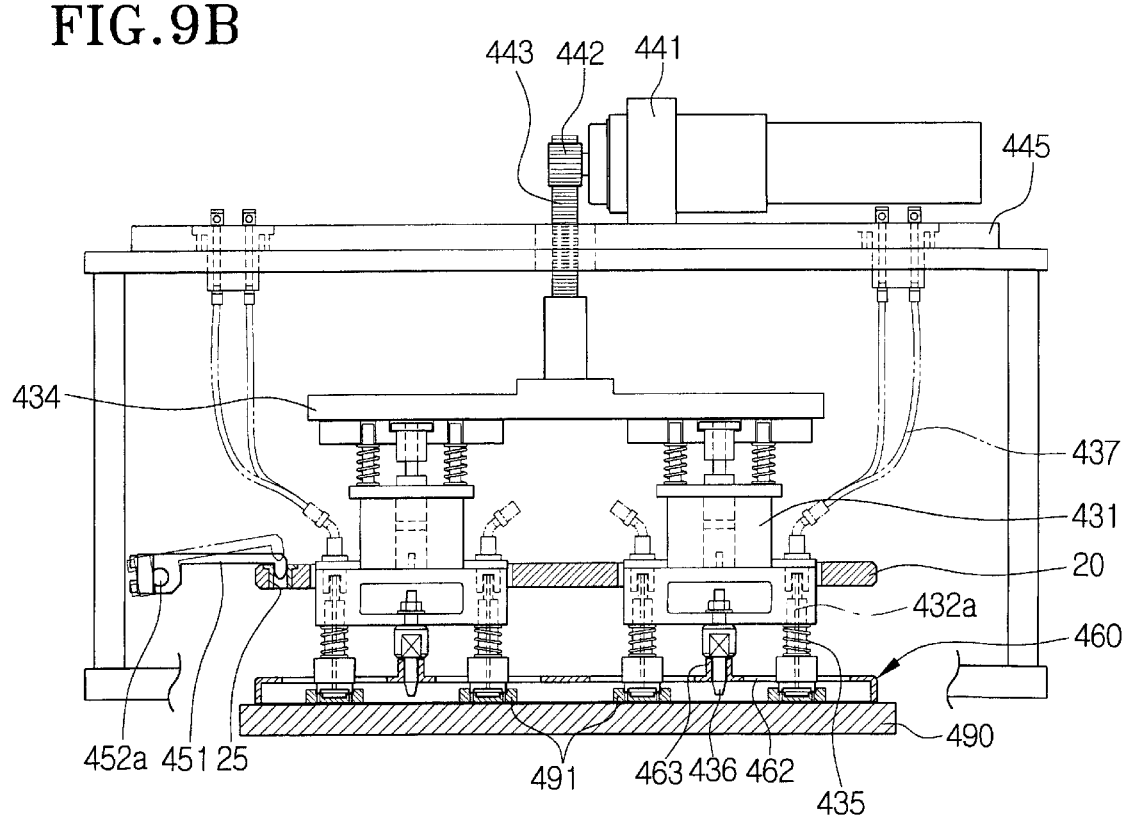

FIG. 8 is a schematic perspective view for showing the test chamber of the rambus handler according to the preferred embodiment of the present invention. FIGS. 9A and 9B are front and side elevation views for showing the structure of the test chamber of FIG. 8 in greater detail.

Figure 11A:
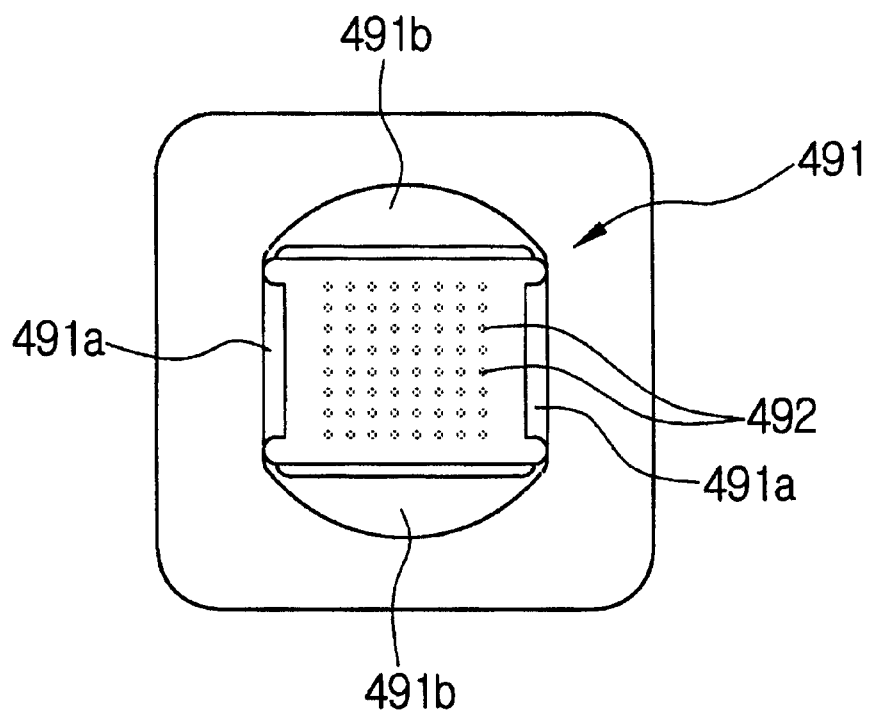
FIGS. 11A and 11B are plan and sectional views, respectively, for showing the structure of sockets employed in the test heads of test chambers according to the present invention.
Figure 11B:
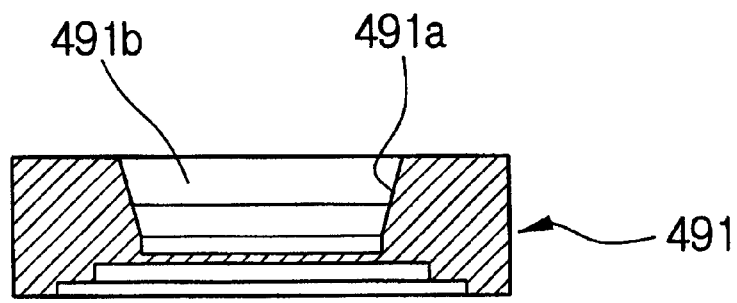
Figure 12A:
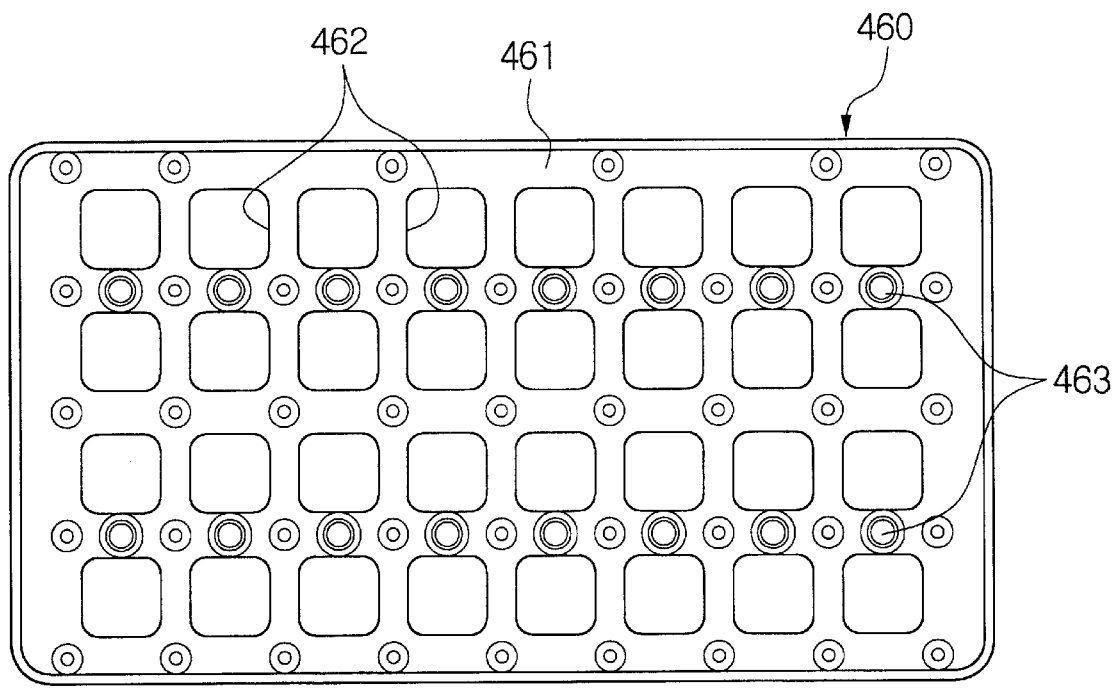
FIGS. 12A and 12B are plane and sectional views, respectively, for showing the structure of contact guide plates of the test chambers according to the present invention.
Figure 12B:
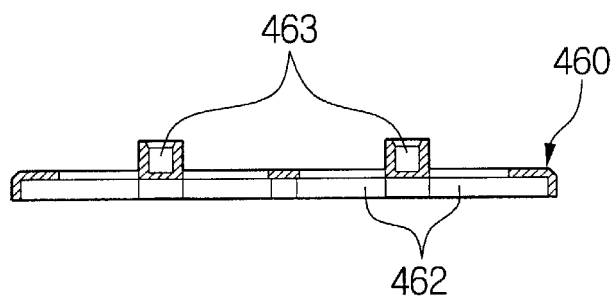

FIGS. 11A and 11B are plan and sectional views, respectively, for showing the structure of sockets employed in the test heads of test chambers according to the present invention. FIGS. 12A and 12B are plane and sectional views, respectively, for showing the structure of contact guide plates of the test chambers according to the present invention.

Figure 13A:
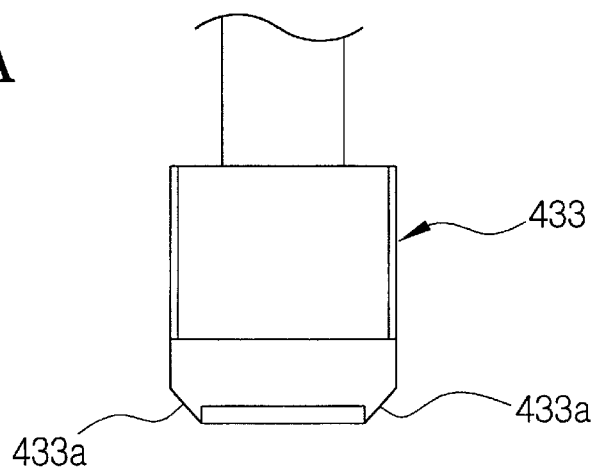
FIGS. 13A, 13B, and 13C are front, bottom, and side elevation views, respectively, for showing the shape of vacuum pads according to the present invention.
Figure 13B:
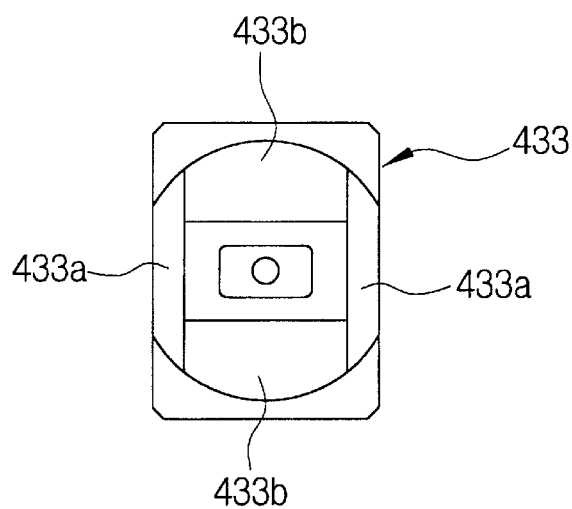
Figure 13C:
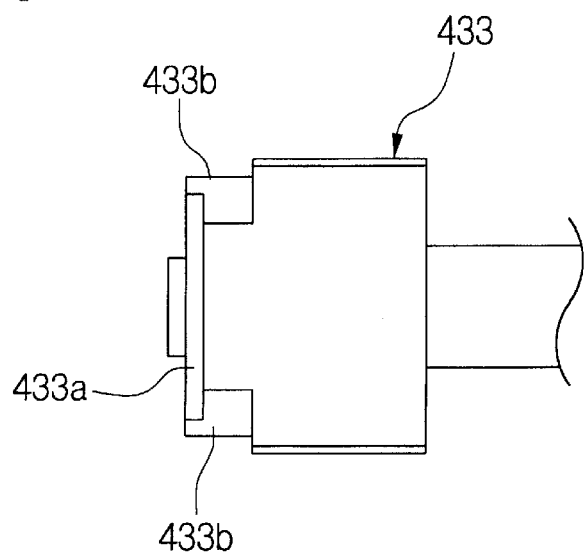
Figure 14A:
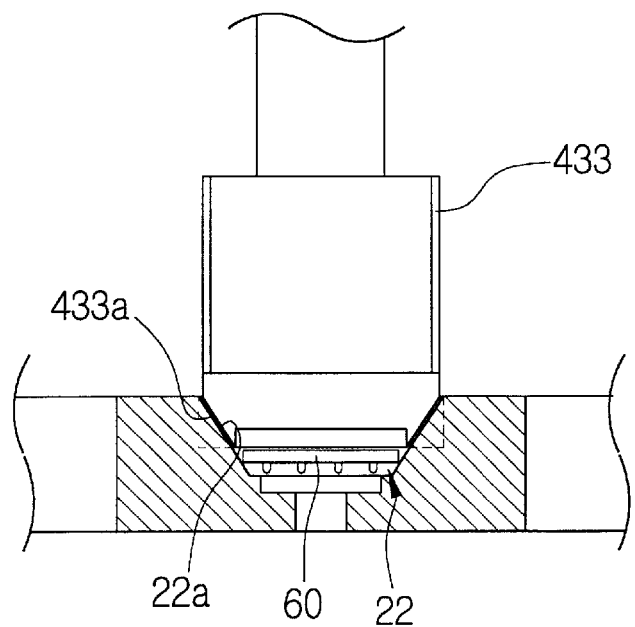
FIGS. 14A and 14B are sectional views shown in X and Y directions, respectively, for showing the device being picked by a contact picker assembly according to the present invention.
Figure 14B:
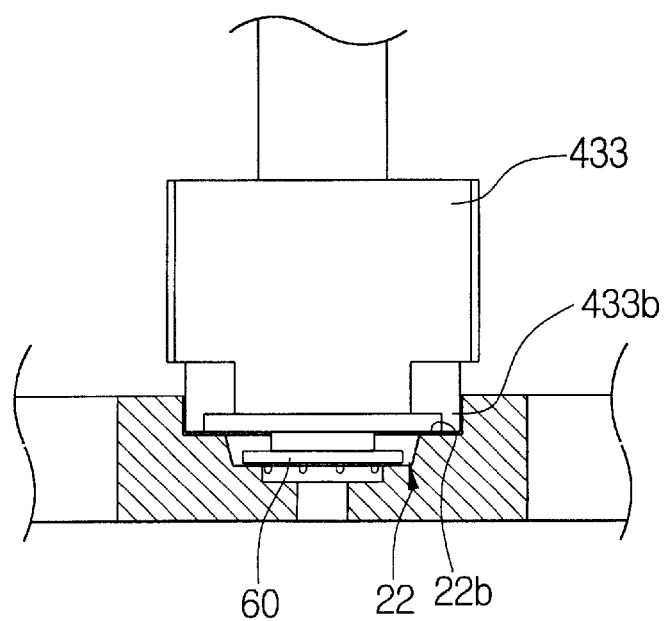
Figure 15A:
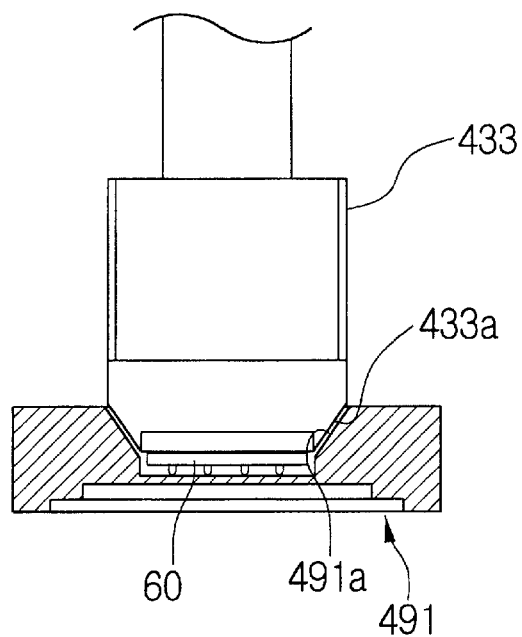
FIGS. 15A and 15B are sectional views shown in X and Y directions, respectively, for showing the device being connected by the contact picker assembly according to the present invention.
Figure 15B:
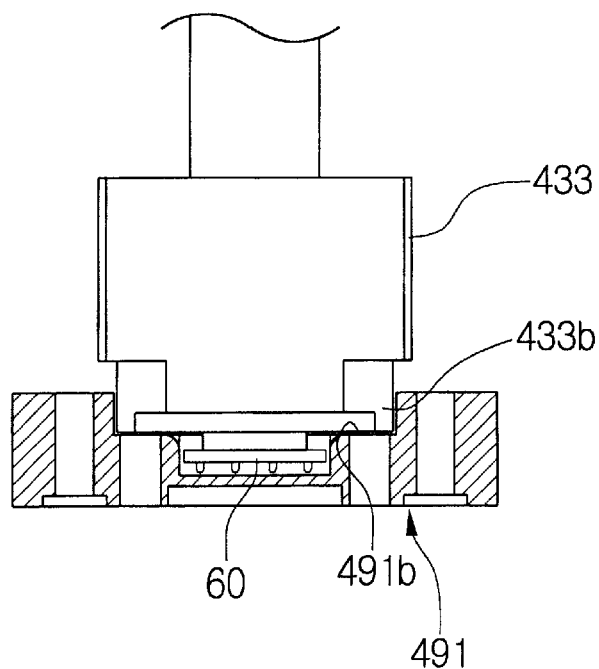
Figure 16:
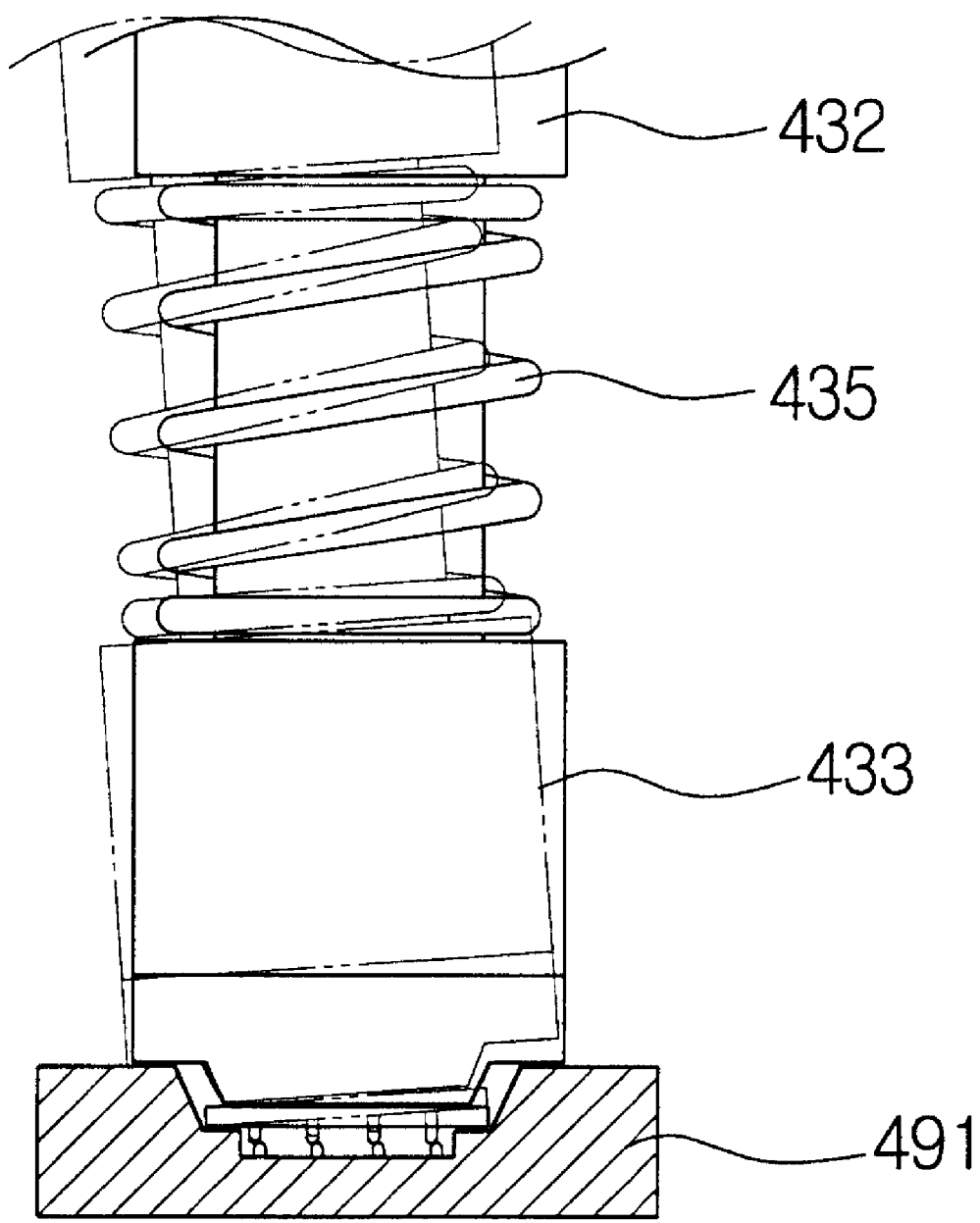
FIG. 16 is an enlarged sectional view for showing the main portion of the preferred embodiment of the present invention, i.e., the vacuum pad of the contact picker assembly being connected with the test socket.

FIGS. 13A, 13B, and 13C are front, bottom, and side elevation views, respectively, for showing the configuration of vacuum pads according to the present invention. FIGS. 14A and 14B are sectional views shown in X and Y directions, respectively, for showing the device being picked by a contact picker assembly according to the present invention. FIGS. 15A and 15B are sectional views shown in X and Y directions, respectively, for showing the device being connected by the contact picker assembly according to the present invention. FIG. 16 is an enlarged sectional view for showing the main portion of the preferred embodiment of the present invention, i.e., the vacuum pad of the contact picker assembly being connected with the test socket.

The test head 490 is connected to a tester (not shown), and is formed on the lower portion of the test chamber 400 of the rambus handler. As shown in FIG. 9B, a plurality of text sockets 491 are arranged on the test head 490. For testing, the devices 60 are inserted, and thus electrically connected in the test sockets 491. A plurality of connecting pins 492 are formed in the test sockets 491 in an area array arrangement over the whole lower area of the test sockets 491 for testing the BGA or CSP type devices 60. Further, each test socket 491 has third slope guiding sections 491*a* formed on both left and right sides for guidance when the devices 60 are connected to the test sockets 491 by the contact picker assembly 430, and third hard stop contacting sections 491*b* formed on both front and rear sides to serve the same purpose as the third slope guiding sections 491*a*, which will be described later in greater detail.

Figure 10A:
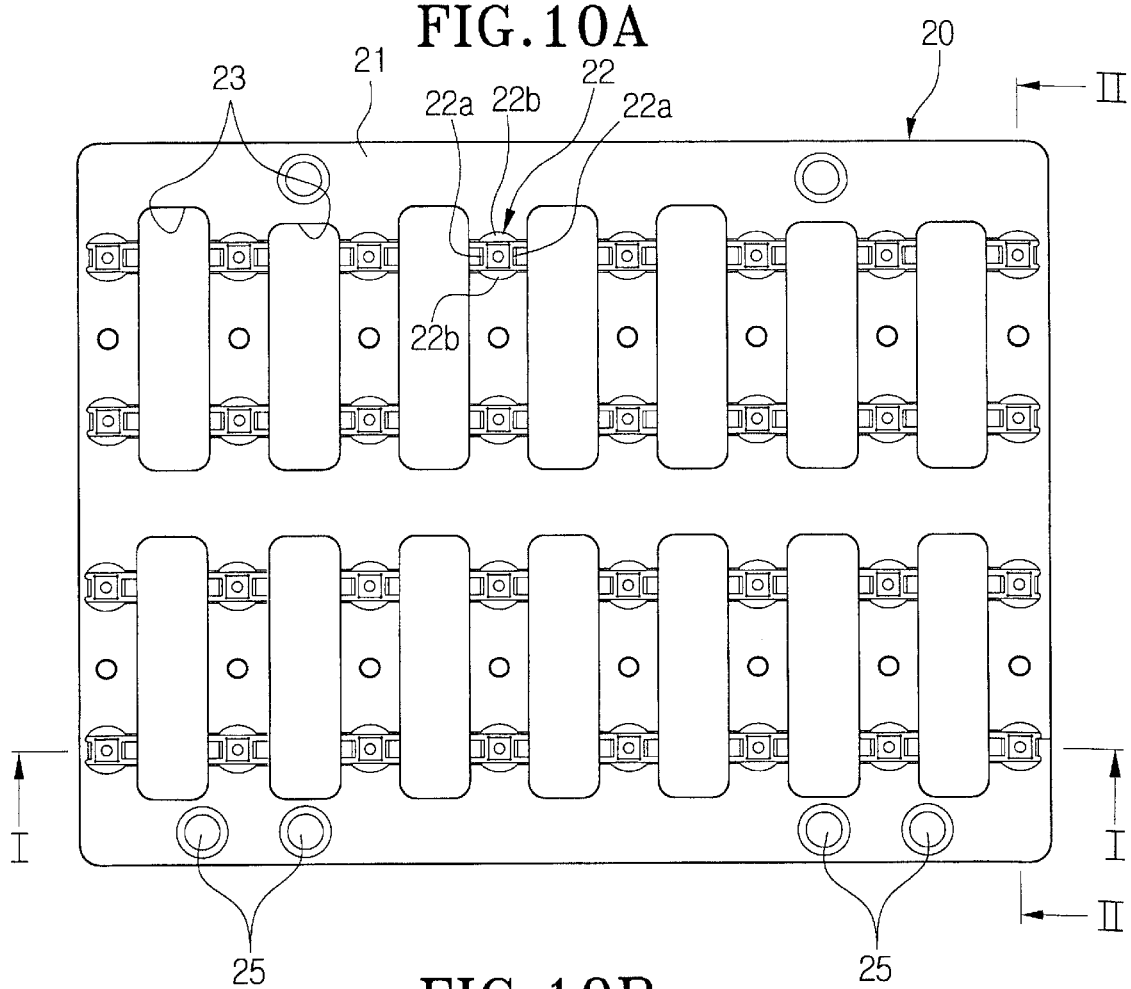
Figure 10B:
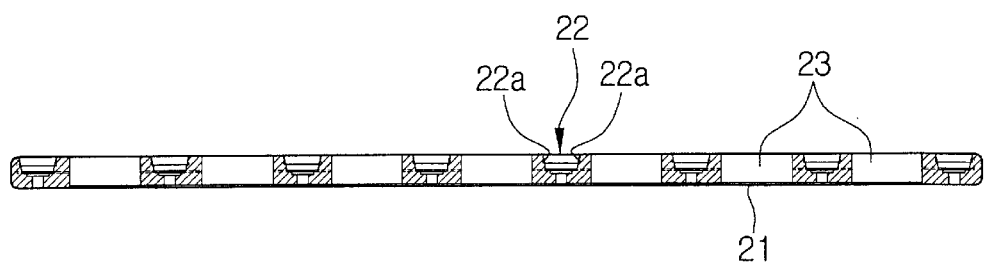
Figure 10C:
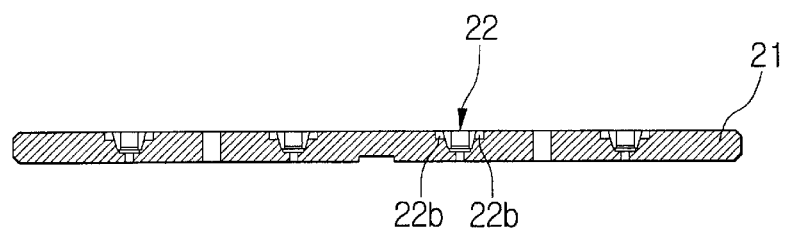

The boats 20 carry the devices 60 to the initial testing position on the upper portion of the test head 490. As shown in FIGS. 10A, 10B, and 10C, each boat 20 includes a square body 21, a plurality of receiving hoes 22 formed on the body 21 to receive the devices 60, and piercing holes 23 of a predetermined size formed between the receiving holes 22. Although this embodiment depicts the device arrangement in which thirty two (32) devices 60 are arranged in the device receiving holes 22 by four columns and eight rows and the boats respectively have eighteen (18) piercing holes 23 formed between the receiving holes 22, the number of device receiving holes 22 and the piercing holes 23 may be increased. Further, second slope guiding sections 22*a* are formed in the left and right sides of each device receiving hole 22 of the boat 20 to guide the devices 60 when the devices 60 are picked up by the contact picker assembly 430. Second hard stop contacting sections 22*b* are also formed on front and rear sides of the receiving holes 22 to serve the same purpose as the second slope guiding sections 22*a*, which will be described later in greater detail.

The contact picker assembly 430 is disposed above the test head 490 in a manner that the contact picker assembly 430 is vertically movable. Accordingly, after picking and elevating a certain number of devices 60 from the device receiving holes 22 of the boat 20 at the initial testing position to a predetermined height, the contact picker assembly 430 de-elevates the devices 60 into the test sockets 491 to thereby electrically connect the devices 60 to the test sockets 491 for testing. As shown in FIGS. 8, 9A and 9B, such a contact picker assembly 430 includes a plurality of pickers 431, an elevation plate 434, and shock absorbing means 438.

The pickers 431 include four picker members 432 substantially in the shape of square-preferably rectangle. The picker members 432 include vacuum spaces 432*a* vertically defined therewithin, respectively. The upper portions of the picker members 432 are connected with vacuum hoses 437, while the lower portions thereof are connected to vacuum pads 433 for adsorbing the devices 60. The vacuum pads 433 are connected to the picker members 432 in a manner such that the vacuum pads 433 independently move within a predetermined range with respect to the picker members 432. Between the picker members 432 and the vacuum pads 433. Compression coil springs 435 are disposed to elastically support the vacuum pads 433 toward the picker members 432 downwardly. Accordingly, when there is assembly error by the contact picker assembly 431 and position of the certain vacuum pad 433 deviates from originally intended position for socket connection, the certain vacuum pad 433 moves to adjust its position to thereby, the devices 60 can be inserted in the intended sockets, accurately. Although it is preferable that each picker 431 has four vacuum pads 433, it is not strictly limited thereto. Accordingly, numbers and arrangement of the vacuum pads 433 and the pickers 431 may vary depending on certain situations.

As shown in FIGS. 13A, 13B, and 13C, each vacuum pad 433 includes first slope guiding sections 433*a* formed on left and right sides, corresponding to the second slope guiding sections 22*a* of the device receiving holes 22 and the third slope guiding sections 491*a* of the sockets 491. Each vacuum pad 433 also includes first hard stop contacting sections 433*b* formed on front and rear sides thereof, corresponding to the second hard stop contacting sections of the device receiving holes 22 and the third hard stop contacting sections 491*b* of the sockets 491.

Here, as shown in FIG. 14A, the first slope guiding sections 433*a* of the vacuum pads 433 and the second slope guiding sections 22*a* of the device receiving holes 22 guide the X-directional movement of the vacuum pads 433 within the device receiving holes 22. Also, as shown in FIG. 14B, the first hard stop contacting sections 433*b* of the vacuum pads 433 and the second hard stop contacting sections 22*b* of the device receiving holes 22 guide the Y-directional movement of the vacuum pads 433 within the device receiving holes 22. As a result, the vacuum pads 433 are enabled to adsorb the devices 60 at an accurate picking position, and accordingly, picking error can be minimized.

Further, as shown in FIG. 15A, the first slope guiding sections 433*a* and the third slope guiding sections 491*a* of the sockets 491 guide the X-directional movement of the vacuum pads 433 within the sockets 491, while as shown in FIG. 15B, the first hard stop contacting sections 433*b* of the vacuum pads 433 and the third hard stop contacting sections 491*b* of the sockets 491 guide the Y-directional movement of the vacuum pads 433 within the sockets 491. Accordingly, since the vacuum pads 433 can insert and electrically connect the devices 60 into the sockets 491 accurately, any possibility of having defective connection can be prevented.

Meanwhile, between the pickers 431 and elevation plate 434, shock absorbing means 438 are disposed to absorb excessive weight to the pickers 431. Also on the lower sides of the pickers 431, pairs of contact guide pins 436 are formed to guide the de-elevation of the pickers 431.

The elevation plate 434 supports the pickers 431, enabling the plurality of pickers 431 to simultaneously pick and connect the devices 60 to the test sockets 491.

The shock absorbing means 438 are disposed between the pickers 431 and the elevation plate 434, to elastically connect the pickers 431 to the elevation plate 434 in a manner that the pickers 431 are movable within a predetermined range with respect to the elevation plate 434. The shock absorbing means 438 include first shock absorbing plates 438*a* connected to the upper portions of the pickers 431, second shock absorbing plates 438*b* connected to the elevation plate 434 corresponding to the first shock absorbing plates 438*a*, linking bars 438*c* for connecting the first shock absorbing plates 438*a* to the second shock absorbing plates 438*b* in a manner that the first shock absorbing plates 438*a* are movable with respect to the second shock absorbing plates 438*b* within a predetermined range, and compression coil springs 438*d* disposed around the linking bars 438*c* for elastically supporting the first shock absorbing plates 438*a* to the second shock absorbing plates 438*b*. Accordingly, the pickers 431 elastically move in contact with the test sockets 491, to accurately connect the devices 60 to the test sockets 491.

Contact picker assembly elevating means 440 is also provided. The contact picker assembly elevating means 440 vertically moves the contact picker assembly 430, picking the devices 60 from the boat 20 with its pickers 431, to thereby insert and electrically connect the devices 60 into the test sockets 491. As shown in FIGS. 8, 9A and 9B, the elevation means 440 includes a driving source, i.e., a motor 441, pinion 442, rack bar 443, and guiding section 444.

The motor 441 is fixedly mounted on an upper portion of the frame 445 which is mounted on the contact picker assembly 430. The motor 441 is an AC servo-motor.

The pinion 442 is engaged with the shaft of the motor 441. The rack bar 443 is passed through the upper portion of the contact picker assembly 430, more specifically, the rack bar 443 stands upright from the center upper portion of the elevation plate 434, and passed through the frame 445. The rack bar 443 includes a rack 443a toothed with the pinion 442 in a lengthwise direction. Accordingly, the rack bar 443 is vertically moved when the motor 441 operates.

The guiding section 444 guides the elevation of the contact picker assembly 430. The guiding section 444 includes a pair of guiding shafts 444a fixedly protrude from both upper sides of the elevation plate 434 through the frame 445, and a pair of guiding bushes 444b fixed on the frame 445 to movably support the guiding shafts 444a.

Boat conveying means 450 is also provided. The boat conveying means 450 moves boats 20 from the initial test position by a distance corresponding to a half of the pitch of a device receiving hole 22, to thereby enable the contact picker assembly 430 picking the devices 60 to de-elevate the devices 60 to the test sockets 491 through the piercing holes 23 of the boats 20. Accordingly, the contact picker assembly 430 is enabled to pick the devices 60 from the boats 20 at the initial test position, and de-elevate and insert the devices 60 into the test sockets 491 through the piercing holes 23 of the boats 20 moved at a distance of a half pitch. The boat conveyer 450 includes a gripping member 451, pivoting section 452 and driving section 453.

The gripping member 451 is inserted in a gripping hole 25 formed on a side of the boat 20, to pivot adjacent to the boat 20 and thus selectively grip the boat 20. Here, the gripping hole 25 may include two holes formed in front and rear ends of the boat 20. Also, an end of the gripping member 451 may be shaped to correspond to the gripping hole 25.

The pivoting section 452 supports the gripping member 451, and pivots the gripping member 451 into the gripping hole 25. The pivoting section 452 includes a pivoting bar 452a for pivotally supporting the gripping member 451, a pivoting block 452b connected to the end of the pivoting bar 452a, and a pneumatic cylinder 452c connected to the opposite end from the pivoting bar-connected end for pivoting the pivoting block 452b. When the pneumatic cylinder 452c operates, the pivoting block 452b pivots, and accordingly, the pivoting bar 452a connected to the pivoting block 452b pivots. As a result, the gripping member 451 is inserted in the gripping hole 25 of the boat 20.

The driving section 453 linearly moves the gripping member 451 which grips the boat 20 in cooperation with the pivoting section 452. The driving section 453 includes a driving source, i.e., a motor 453a, a ball screw 453b connected to the shaft of the motor 453a, a ball nut 453c for linearly moving according to the rotational movement of the ball screw 453b, and a connecting member 453d for connecting the ball nut 453c with the pivoting bar 452a of the pivoting section 452. The pivoting bar 452a is passed through the connecting member 453d and pivotally connected to the pivoting block 452b. The pivoting block 452b is supported on the other side of the connecting member 453d. Accordingly, when the motor 453a operates, the ball nut 453c is linearly moved along the ball screw 453b connected to the motor 453a, and the pivoting bar 452a connected to the ball nut 453c through the connecting member 453d is moved in the advancing direction of the ball nut 453c, moving the boat 20.

Meanwhile, as shown in FIG. 9B, the contact guide plate 460 is mounted on the test head 490, to guide the connection of the devices 60 into the sockets 491 by the pickers 431. As shown in FIGS. 12A and 12B, the contact guide plate 460 includes a plurality of socket exposing holes 462 formed in a square body 461 in the same arrangement as of the test sockets 491 in the test head 490. The pickers 431 insert and connect the devices 60 in the test sockets 491 through the socket exposing holes 462. Further, the contact guide plate 460 includes a plurality of contact guiding pin holes 463 formed between the respective socket exposing holes 462. The contact guiding pin holes 463 receive the contact guiding pins 436 protruding from the pickers 431 during the de-elevation of the pickers 431, to thereby guide the connection of the devices 60 into the test sockets 491. As a result, the devices 60 can be accurately inserted in the sockets 491 and electrically connected to the contacting sections 492 of the sockets 491.

Hereinafter, position adjustment when the contact picker assembly 430 adsorbs the devices 60 for testing will be described in greater detail.

When the rambus handler operates, and the boat 20 loaded with a plurality of devices 60 to be tested thereon is moved to the test position of the test head 490, the contact picker assembly 430 is de-elevated to the boat 20 by the contact picker assembly elevating means 440, adsorbs a predetermined number of devices 60 from the boat 20, and elevates.

Next, the boat 20 is moved by a half of pitch of the receiving hole 22 by the boat conveying means 450, aligning the piercing holes 23 of the boat 20 with the sockets 491 of the test head 490.

Then the contact picker assembly 430 is de-elevated by the contact picker assembly elevating means 440, through the piercing holes 23 and to the sockets 491, to insert and connect the devices 60 in the sockets 491. As shown in FIG. 8, during the de-elevation of the pickers 431, movement of the pickers 431 are first guided while a pair of contact guiding pins 436 formed on both sides of the pickers 431 are inserted in the contact guiding pin holes 461 of the contact guiding plate 460 mounted on the test head 490. Here, even when the contact guiding pins 436 are inserted in the contact guiding pin holes 461 of the contact guiding plate 460, certain number of vacuum pads 433 may not be accurately connected in the sockets 491 due to assembly errors of the contact picker assembly 430, causing defective connections. According to the present invention, however, corresponding vacuum pads 433 compensates the position errors, and the devices 60 can be accurately connected.

For example, as shown in two-dotted line of FIG. 16, when a certain vacuum pad 433 is inaccurately inserted in the socket 491, the vacuum pad 433, which is movably connected to the picker member 432, moves and adjusts its position to an originally intended position in the sockets 491 as shown in a solid line of FIG. 16. As a result, a possible defective connection can be prevented.

After an elapse of a predetermined time from connecting the devices 60 in the sockets 491, the contact picker assembly 430 is elevated to the initial test position through the piercing holes 23 of the boat 20. After that, the contact picker assembly 430 de-elevates to load the test completed devices 60 on the boat 20 which is returned to the initial test position.

Hereinafter, the testing operation in the test chamber of the rambus handler constructed according to the present invention will be described in greater detail with reference to FIGS. 17A, 17B, and 18.

Figure 17A:
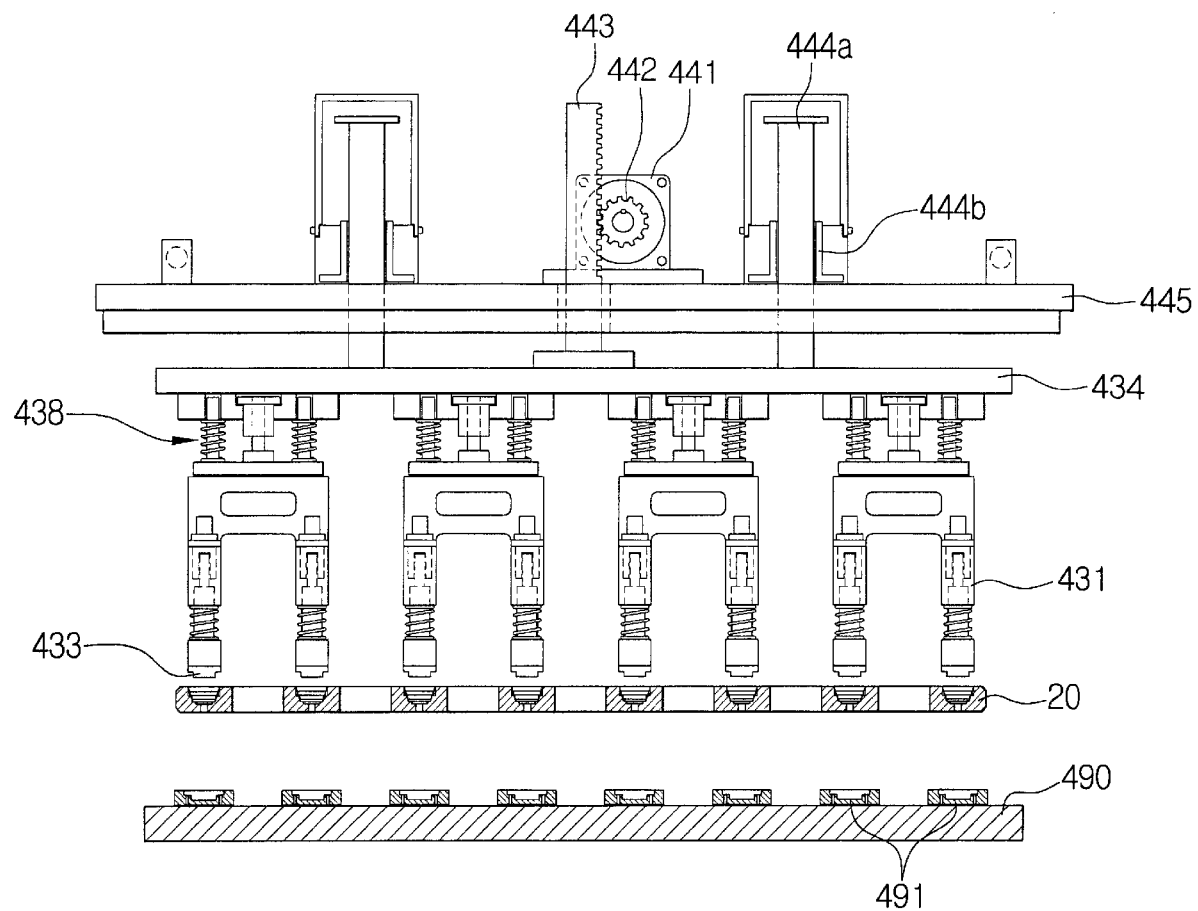
FIGS. 17A and 17B are front views for showing the devices being adsorbed by a picker, and connected to the test socket, respectively.
Figure 17B:
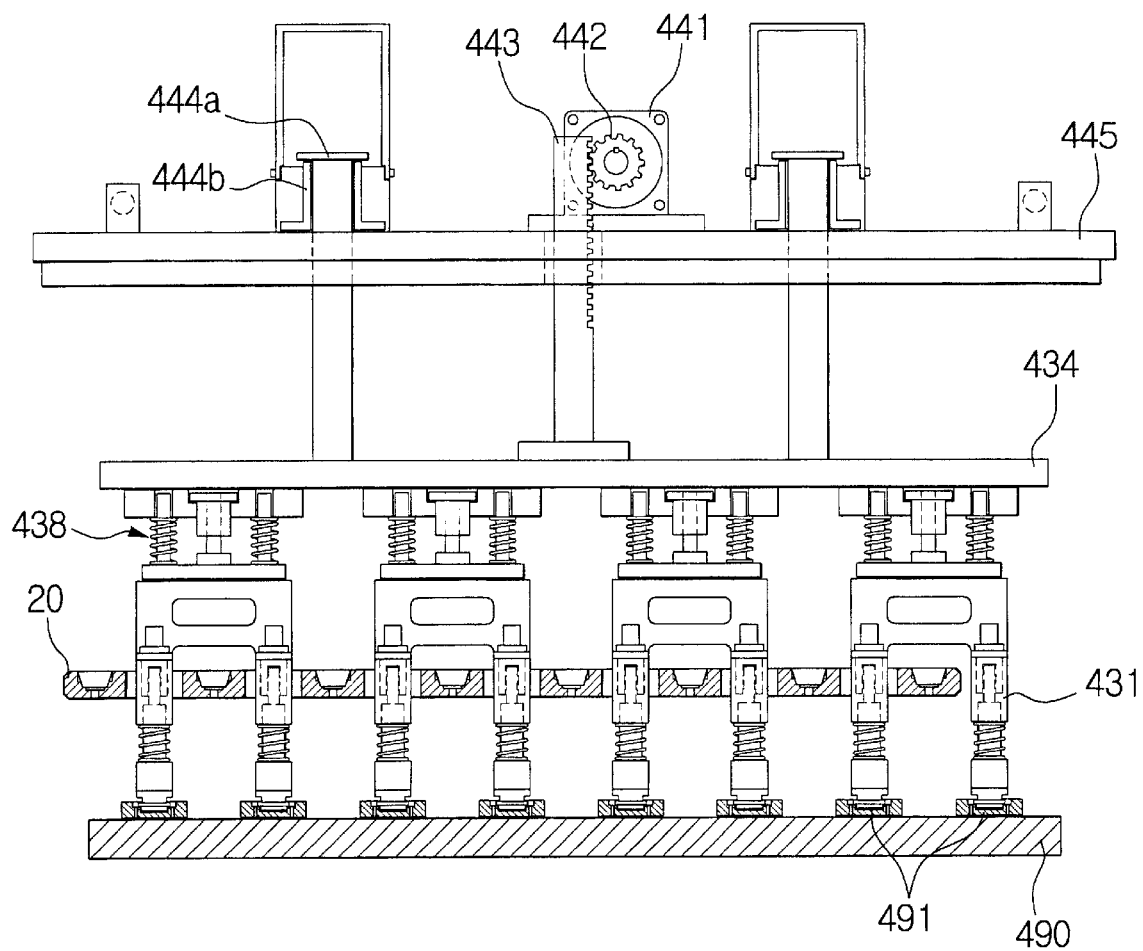
Figure 18:
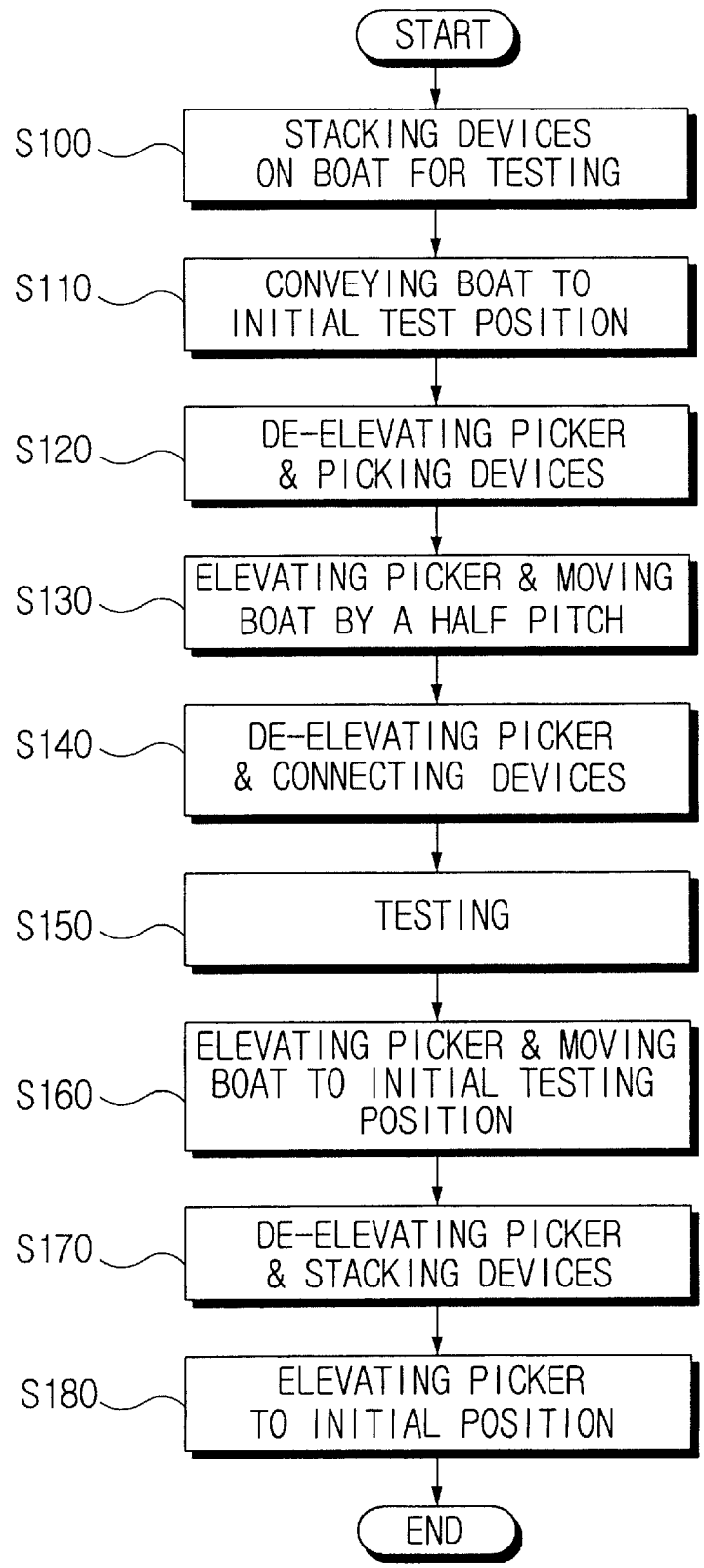
FIG. 18 is a flow chart for explaining a method for testing the devices in the test chambers of the rambus handler according to the present invention.

FIGS. 17A and 17B are front views for showing the devices 60 being adsorbed by a picker, and connected to the test socket, respectively. FIG. 18 is a flow chart for explaining a method for testing the devices 60 in the test chambers of the rambus handler according to the present invention.

First, a plurality of devices 60 are lifted from the device loading section 200 and stacked in the device receiving holes 22 of the boat 20 (step S100). The boat 20 stacked with the devices 60 are moved to the test chamber 400 of the rambus handler through a predetermined set of paths and stops at the initial test position on the test head 490 of the test chamber 400 (step S110).

When the boat 20 is stopped at the upper portion of the test head 90, the pickers 431 thereabove de-elevate to adsorb and pick a certain number of devices 60 (step S120). After picking the devices 60, the pickers 431 elevate to the initial test position.

When the pickers 431 elevate, the boat conveying means 450 moves the boat 20 from the initial test position by a distance corresponding to a half of the pitch of the piercing hole 23 of the boat 20, to align the respective piercing holes 23 of the boat 20 with the elevation path (step S130).

After that, the pickers 431 de-elevate to the test sockets 491 through the piercing holes 23 of the boat 20 and insert and electrically connect the devices 60 in the test sockets 491 (step S140). Here, since the pickers 431 elastically contact with the sockets 491 due to the shock absorbing means 438, the devices 60 can be connected with the connection pins 492 of the sockets 491 at a uniform pressure. Then the test process is carried out (step S150).

When the test is completed, the pickers 431, picking the devices 60, elevate to the initial test position through the piercing holes 23 of the boat 20. After the pickers 431 elevate to the initial test position, the boat 20 is returned to the initial test position (step S160).

When the boat 20 is returned to the initial test position, the pickers 431 de-elevate to stack the devices 60 in the receiving holes 22 of the boat (step S170), and elevate to the initial test position (step S180).

Until all the intended devices 60 undergo the testing process, the processes described above repeat.

As described above, in the rambus handler according to the present invention, the boat having a plurality of receiving holes 22 and piercing holes 23 formed between the receiving holes 22, is used. First, the pickers 431 adsorb a certain number of devices 60 from the boat 20, convey the boat 20 by a distance corresponding to a half pitch of the piercing hole 23 to align the piercing holes 23 of the boat 20 with the sockets 491 of the test head 490. Then, by de-elevating the pickers 431 to the sockets 491 through the piercing holes 23 of the boat 20, the devices 60 picked by the pickers 431 are connected to the sockets 491, directly.

Although the preferred embodiments described a means and method for testing devices 60 in Area Array Arrangement such as BGA or CSP type devices 60, the present invention may be also applied to TSOP type devices which have a plurality of electrodes protruding from both sides of package.

Figure 19:
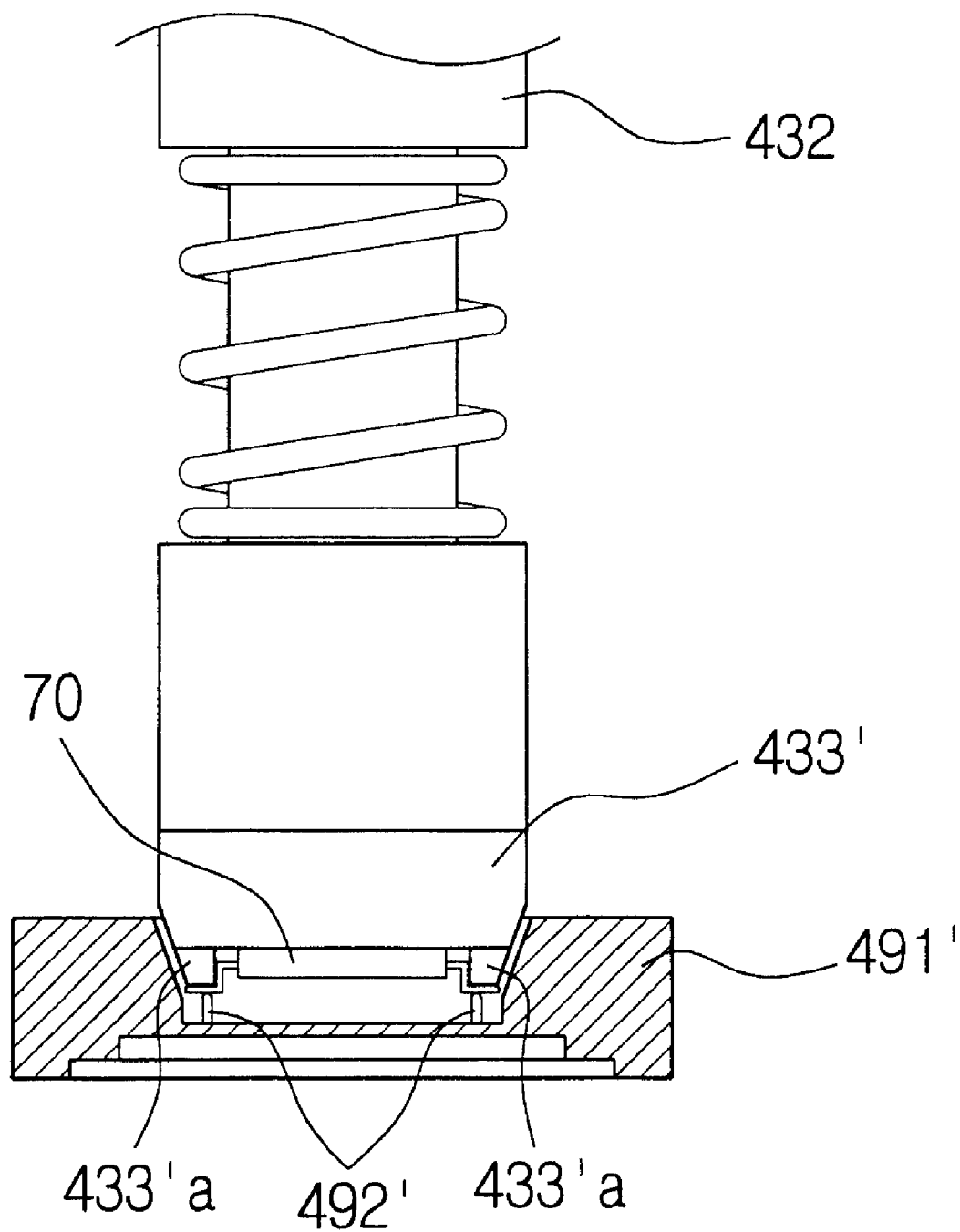
FIG. 19 is a sectional view for showing the main portion of a variation of the present invention in which a TSOP type device being connected to the test socket which is developed to test the TSOP type devices.

FIG. 19 shows the main portion of the test chamber of the rambus handler partially modified to test the TSOP type devices.

As shown in FIG. 19, connecting pins 492' are arranged at both sides of the sockets 491' in the same arrangement as the electrodes of devices 70. Vacuum pads 433' connected to ends of the pickers have nonconductive pressing members 433'a for pressing the electrodes of the devices 70 when the devices 70 are connected to the sockets by the vacuum pads 433'.

Since the construction and operations of the other elements are already described earlier, repetitious description thereof will be omitted.

Accordingly, not only the BGA or CSP type devices 60, but also the TSOP type devices 70 can be automatically tested by being connected to the test sockets directly through a partial modification.

As described above, according to the present invention, the rambus handler is capable of testing rambus type devices such as BGA or CSP type devices, automatically.

Further, according to the present invention, even when the pitches of the receiving holes are varied during the picking-and-placing operation on the devices, since the cam followers as the guiding protrusions are guided through the guiding grooves of the pitch adjusting plate and adjust the pitches between the respective cylinders, cumulative errors can be prevented. Further, since the present invention picks-and-places sixteen (16) devices at a time, picking-and-placing operation time can be reduced, while the work efficiency of the testing equipment improves.

Further, according to the present invention, even when the position of the vacuum pads varies from its originally intended place in the socket due to assembly error of the contact picker assembly, etc., the vacuum pad moves in contact with the socket to the originally intended place of the socket. Accordingly, any possibility of having defective connection between the device and socket can be prevented, while the reliability of the test improves.

Although the preferred embodiment of the present invention has been shown and described, it will be appreciated by those skilled in the art that changes may be made in these embodiments without departing from the principles and spirit of the invention, the scope of which is defined in the claims and their equivalents.

What is claimed is:

1. A rambus handler comprising:

a stacker stacking user trays loaded with semiconductor devices to be tested, positioning the user trays at a device supplying position one by one, positioning empty user trays at a device receiving position where the empty user trays receive the semiconductor devices that have been tested, and stacking user trays loaded with semiconductor devices that have been tested;

a loader having double-row displaceable hands picking up the semiconductor devices from the user trays at the device supplying position and positioning the semiconductor devices in a boat at a device loading position;

a temperature controlling chamber having an inlet through which the semiconductor devices are received from the loader and an outlet through which the semiconductor devices are discharged, said temperature controlling chamber changing temperatures of the semiconductor devices from an initial temperature to different temperatures while moving the boats from inlet position to outlet position;

a test chamber testing the semiconductor devices in sockets of a test head;

a recovery chamber having an inlet through which the semiconductor devices are received from the test chamber and an outlet through which the semiconductor devices are discharged, said recovery chamber recovering said initial temperature of the semiconductor devices while moving the boats from inlet position to outlet position;

a sorter having a plurality of conveying buffers and a plurality of single-row displaceable hands picking the test-completed semiconductor devices from the boats by order of boat discharge from the recovery chamber, and stacking the semiconductor devices in a plurality of predetermined areas of the plurality of conveying buffers corresponding to respective grades of semiconductor devices sorted by the testing results; and an unloader stacking the semiconductor devices at the conveying buffers in the user trays segregated according to respective grades of the semiconductor devices.

2. The rambus handler as claimed in claim 1, the loader further comprising:

a loading robot attached to the double-row displaceable hands, said loading robot positioning the double-row displaceable hands above the user trays and the device loading position; and a device buffer holding spare semiconductor devices.

3. The rambus handler as claimed in claim 1, wherein each of the single-row displaceable hands comprises:

a hand frame;

a guiding bar disposed on the hand frame;

a plurality of pickup blocks inserted by, and slid on the guiding bar; and pickup block pitch adjusting means varying pitches between the guiding bar and the plurality of pickup blocks by being elevated and de-elevated with respect to the hand frame.

4. The rambus handler as claimed in claim 3, wherein the pickup block pitch adjusting means comprises:

guiding protrusions protruding from the plurality of pickup blocks;

a pitch adjusting plate having a plurality of guiding grooves receiving the guiding protrusions, in a manner such that the guiding protrusions at ends of the guiding grooves indicate narrow pitches between the pickup blocks while the guiding protrusions at the opposite ends indicate wider pitches between the pickup blocks;

driving means elevating and de-elevating the pitch adjusting plate; and elevation guiding means formed on the hand frame, said elevation guiding means guiding elevation/de-elevation of the pitch adjusting plate.

5. The rambus handler as claimed in claim 4, wherein the elevation guiding means comprises:

a linear motion guide disposed on the hand frame; and a linear motion block disposed on the pitch adjusting plate.

6. The rambus handler as claimed in claim 3, wherein the pickup blocks comprise pickup cylinders attached thereto for picking-and-placing the semiconductor devices.

7. The rambus handler as claimed in claim 1, wherein each of the double-row displaceable hands comprises:

a hand frame;

a first guiding bar disposed on the hand frame;

a first plurality of pickup blocks inserted by, and slid on the first guiding bar;

first pitch adjusting means varying the pitches between the first guiding bar and the first plurality of pickup blocks by being elevated and de-elevated with respect to the hand frame;

width adjusting means mounted on the hand frame;

a second guiding bar disposed on the width adjusting means;

a second plurality of pickup blocks inserted by, and slid on the second guiding bar; and second pitch adjusting means varying pitches between the second guiding bar and the second plurality of pickup blocks by being elevated and de-elevated with respect to the hand frame.

8. The rambus handler as claimed in claim 7, wherein the first and second pitch adjusting means comprise:

guiding protrusions protruding from the plurality of pickup blocks;

first and second pitch adjusting plates having a plurality of guiding grooves receiving the guiding protrusions in a manner such that the guiding protrusions at one ends of the guiding grooves indicate narrow pitches between the pickup blocks while the guiding protrusions at the opposite ends of the guiding grooves indicate wider pitches between the pickup blocks; and first and second driving means elevating and de-elevating the first and second pitch adjusting plates.

9. The rambus handler as claimed in claim 7, wherein the first pitch adjusting means comprises first elevation guiding means mounted on the hand frame, said first elevation guiding means guiding the elevation and de-elevation of the first pitch adjusting plate, and, the second pitch adjusting means comprises second elevation guiding means mounted on the width adjusting means, said second elevation guiding means guiding the elevation or de-elevation of the second pitch adjusting plate.

10. The rambus handler as claimed in claim 7, wherein the width adjusting means comprises:

a pneumatic cylinder mounted on the hand frame;

a width adjusting bracket connected to an end of a rod of the pneumatic cylinder;

a plurality of linear motion blocks mounted on the width adjusting bracket; and a plurality of linear motion guides mounted on the hand frame in a perpendicular relation to the first guiding bar, for guiding the linear motion blocks.

11. The rambus handler as claimed in claim 1, wherein the test chamber comprises:

a test head having a plurality of test sockets in which the semiconductor devices are inserted for testing;

a boat carrying the semiconductor devices to an initial test position, the boat having a plurality of receiving holes receiving the semiconductor devices and a plurality of piercing holes formed between the receiving holes;

a contact picker assembly disposed above the test head to be moved in a vertical direction, the contact picker assembly having shock absorbing means, the contact picker assembly picking the semiconductor devices from the boats and connecting the semiconductor devices directly to the test sockets of the test head;

elevating means vertically moving the contact picker assembly; and boat conveying means moving the boats from the initial test position by a distance of a half pitch of the device receiving hole, to where the contact picker assembly picking the semiconductor devices can de-elevate to the test sockets through the piercing holes of the boats.

12. The rambus handler as claimed in claim 11, wherein the contact picker assembly comprises:

a plurality of pickers having four rectangular picker members having vacuum pads formed on ends thereof for adsorbing the semiconductor devices;

an elevation plate for supporting the plurality of pickers in a manner such that the plurality of pickers simultaneously adsorb and directly connect a predetermined number of semiconductor devices in the test sockets; and shock absorbing means formed between the elevation plate and the pickers, for absorbing and relieving the shock when the semiconductor devices are connected in the test sockets by the pickers.

13. The rambus handler as claimed in claim 11, wherein the shock absorbing means comprises:

first absorbing plates connected to upper portions of the pickers;

second absorbing plates connected to the elevation plate, corresponding to the first absorbing plates;

a plurality of connecting bars connecting the first and second absorbing plates in a manner that the first absorbing plates are moved with respect to the second absorbing plates within a predetermined movement range; and a plurality of compression coil springs disposed around the plurality of connecting bars elastically supporting the first absorbing plates with respect to the second absorbing plates.

14. The rambus handler as claimed in claim 11, wherein the contact picker assembly elevating means comprises:

a motor disposed on one upper side of a frame mounted on the contact picker assembly;

a pinion engaged with a shaft of the motor;

a rack bar protruding upright from an upper center portion of the contact picker assembly and piercing through the frame, the rack bar having a rack engaged with the pinion in a lengthwise direction for moving vertically as the motor operates; and guiding means guiding the elevation or de-elevation of the contact picker assembly.

15. The rambus handler as claimed in claim 14, wherein the guiding means comprises:

a pair of guiding shafts protruding upright from both upper sides of the contact picker assembly and piercing through the frame; and a pair of guiding bushes formed on the frame for movably supporting the guiding shafts.

16. The rambus handler as claimed in claim 11, wherein the boat conveying means comprises:

a gripping member pivotally disposed adjacent to the boat, said gripping member gripping the boat by being selectively inserted in a gripping hole formed on one side of the boat;

a pivot member pivoting the gripping member until the gripping member is inserted into the gripping hole; and a driving means linearly moving the gripping member which grips the boat with the assistance of the pivot member.

17. The rambus handler as claimed in claim 16, wherein the pivot member comprises:

a pivoting bar pivotally supporting the gripping member;

a pivoting block connected to an end of the pivoting bar; and a pneumatic cylinder for pivoting the pivoting block.

18. The rambus handler as claimed in claim 16, wherein the driving means comprises:

a motor;

a ball screw engaged with a shaft of the motor;

a ball nut engaged with the ball screw for linearly moving along with the rotational movement of the ball screw; and a connecting member connecting the ball nut and the pivot member.

19. The rambus handler as claimed in claim 11, wherein the test sockets have connection pin arrangements for testing BGA or CSP type semiconductor devices.

20. The rambus handler as claimed in claim 11, wherein the test sockets have connection pin arrangement for testing TSOP type semiconductor devices, and nonconductive pressing members formed on the lower end of the contact picker assembly for pressing electrodes of the TSOP semiconductor devices to the connection pins of the test sockets when the TSOP semiconductor devices are connected in the test sockets.

21. The rambus handler as claimed in claim 11, wherein the test chamber comprises:

picking position guiding means guiding the vacuum pads of the contact picker assembly to accurate positions in the device receiving holes when the contact picker assembly picks the semiconductor devices;

de-elevation guiding means guiding the contact picker assembly when the contact picker assembly de-elevates to connect the semiconductor devices to the test sockets; and connecting guiding means guiding the vacuum pads of the contact picker assembly to accurate positions in the test sockets when the contact picker assembly connects the semiconductor device to the test sockets.

22. The rambus handler as claimed in claim 21, wherein the picking position guiding means comprises:

first and second slope guides correspondingly formed on left and right sides of the vacuum pads and on both sides of the device receiving holes, said first and second slope guides guiding an X-directional movement of the vacuum pads in the device receiving holes; and first and second hard stop guides of a predetermined radius of curvature, correspondingly formed on front and rear sides of the vacuum pads and on both sides of the device receiving holes, said first and second hard stop guides guiding an Y-directional movement of the vacuum pads in the device receiving holes.

23. The rambus handler as claimed in claim 21, wherein the de-elevation guiding means comprises:

a multiple pairs of contact guiding pins integrally formed on the contact picker assembly; and a contact guiding plate disposed on an upper portion of the test head, the contact guiding plate having a contact guiding pin holes corresponding to the contact guiding pins.

24. The rambus handler as claimed in claim 21, wherein the connection guiding means comprises:

third slope guides formed on both side walls of the test sockets corresponding to the first slope guides of the vacuum pads, said third slope guides guiding an X-directional movement of the vacuum pads; and third hard stop guides formed on both sides of the test sockets corresponding to the first hard stop guides of the vacuum pads, said third hard stop guides guiding an Y-directional movement of the vacuum pads.

25. The rambus handler as claimed in claim 1, wherein the sorter comprises:

a boat conveying shaft conveying the boat forward and backward (Y-direction), and stopping the boat at a device adsorbing position;

a plurality of single-axis robots picking the semiconductor devices from the boat with the single-row displaceable hands, and positioning the semiconductor devices in predetermined areas of the conveying buffers according to the test results; and two conveying buffers carrying the semiconductor devices from the boat to the unloader.

26. The rambus handler as claimed in claim 1, wherein the unloader comprises a double-axis unloading robot having a pickup hand attached to a plurality of pickup cylinders.

27. The rambus handler as claimed in claim 1, wherein the inlet of the temperature controlling chamber is located at upper portion of the temperature controlling chamber and the outlet of the temperature controlling chamber is located at lower portion of the temperature controlling chamber.

28. The rambus handler as claimed in claim 1, wherein the inlet of the recovery chamber is located at lower portion of the recovery chamber and the outlet of the recovery chamber is located at upper portion of the recovery chamber.

29. A rambus handler, comprising:
a stacker stacking user trays loaded with semiconductor devices to be tested;
a loader having double-row displaceable hands picking up the semiconductor devices from the user trays at the device supplying position and positioning the semiconductor devices in a boat at a device locating position;
a temperature controlling chamber changing temperatures of the semiconductor devices from an initial temperature to different temperatures;
a test chamber testing the semiconductor devices in sockets of a test head;
a recovery chamber recovering said initial temperature of the semiconductor devices;
a sorter sorting the semiconductor devices by the testing results, said sorter having a plurality of conveying buffers; and
an unloader stacking the semiconductor devices at the conveying buffers in the user trays segregated according to respective grades of the semiconductor devices.

30. A rambus handler as claimed in claim 20, wherein each of the double-row displaceable hands comprises:
a hand frame;
a first guiding bar disposed on the hand frame;
a first plurality of pickup blocks inserted by, and slid on the first guiding bar;
first pitch adjusting means varying the pitches between the first guiding bar and the first plurality of pickup blocks by being elevated and de-elevated with respect to the hand frame;
width adjusting means mounted on the hand frame;
a second guiding bar disosed on the width adjusting means;
a second plurality of pickup blocks inserted by, and slid on the second guiding bar; and
second pitch adjusting means varying pitches between the second guiding bar and the second plurality of pickup blocks by being elevated and de-elevated with respect to the hand frame.

31. The rambus handler as claimed in claim 30, wherein the first and second pitch adjusting means comprise:
guiding protrusions protruding from the plurality of pickup blocks;
first and second pitch adjusting plates having a plurality of guiding grooves receiving the guiding protrusions in a manner such that the guiding protrusions at one end of the guiding grooves indicate narrow pitches between the pickup blocks while the guiding protrusions at the opposite ends of the guiding grooves indicate wider pitches between the pickup blocks; and first and second driving means elevating and de-elevating the first and second pitch adjusting plates.

32. The rambus handler as claimed in claim 30, wherein the first pitch adjusting means comprises first elevation guiding means mounted on the hand frame, said first elevation guiding means guiding the elevation and de-elevation of the first pitch adjusting plate, and, the second pitch adjusting means comprises second elevation guiding means mounted on the width adjusting means, said second elevation guiding means guiding the elevation or de-elevation of the second pitch adjusting plate.

33. The rambus handler as claimed in claim 30, wherein the width adjusting means comprises:
a pneumatic cylinder mounted on the hand frame;
a width adjusting bracket connected to an end of a rod of the pneumatic cylinder;
a plurality of linear motion blocks mounted on the width adjusting bracket; and
a plurality of linear motion guides mounted on the hand frame in a perpendicular relation to the first guiding bar, said plurality of linear motion guides guiding the linear motion blocks.

34. A rambus handler, comprising:
a stacker stacking user trays loaded with semiconductor devices to be tested;
a loader positioning the semiconductor devices in a boat at a device loading position;
a temperature controlling chamber changing temperatures of the semiconductor devices from an initial temperature to different temperatures;
a test chamber testing the semiconductor devices in sockets of a test head;
a recovery chamber recovering said initial temperature of the semiconductor devices;
a sorter having a plurality of conveying buffers and a plurality of single-row displaceable hands stacking the semiconductor devices in a plurality of predetermined areas of the plurality of conveying buffers corresponding to respective grades of semiconductor devices sorted by the testing results; and
a unloader stacking the semiconductor devices at the conveying buffers in the user trays segregated according to respective grades of the semiconductor devices.

35. The rambus handler as claimed in claim 34, wherein each of the single-row displaceable hands comprises:
a hand frame;
a guiding bar disposed on the hand frame;
a plurality of pickup blocks inserted by, and slid on the guiding bar; and
pickup block pitch adjusting means varying pitches between the guiding bar and the plurality of pickup blocks by being elevated and de-elevated with respect to the hand frame.

36. The rambus handler as claimed in clam 35, wherein the pickup block pitch adjusting means comprises:
guiding protrusions protruding from the plurality of pickup blocks;
a pitch adjusting plate having a plurality of guiding grooves receiving the guiding protrusions, in a manner such that the guiding protrusions at ends of the guiding grooves indicate narrow pitches between the pickup blocks while the guiding protrusions at the oposite ends indicate wider pitches between the pickup blocks;
driving means elevating and de-elevating the pitch adjusting plate; and elevation guiding means formed on the hand frame, said elevation guiding means guiding elevation/de-elevation of the pitch adjusting plate.

37. The rambus handler as claimed in claim 36, wherein the elevation guiding means comprises:

a linear motion guide disposed on the hand frame; and
a linear motion block disposed on the pitch adjusting plate.

* * * * *